INVENTORS
ALBERT H. WINKLER
EMIL O. WIRTH
BY *JCBaisch*
ATTORNEY

INVENTORS
ALBERT H. WINKLER
EMIL O. WIRTH
BY
ATTORNEY

April 11, 1950     A. H. WINKLER ET AL     2,503,930
ENGINE CONTROL MEANS
Filed July 10, 1944                                         8 Sheets-Sheet 3
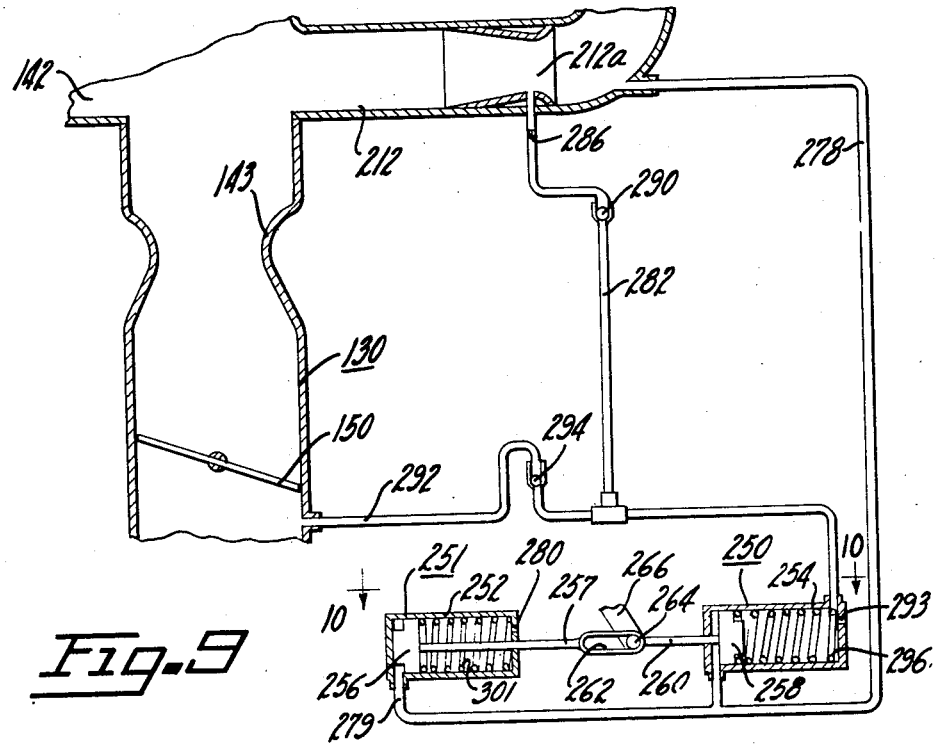
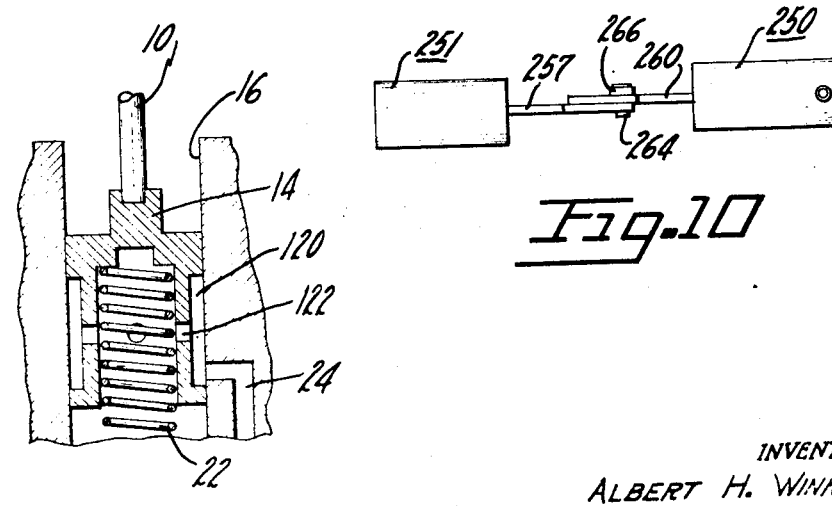
INVENTORS
ALBERT H. WINKLER
EMIL O. WIRTH
BY *J. C. Baisch*
ATTORNEY

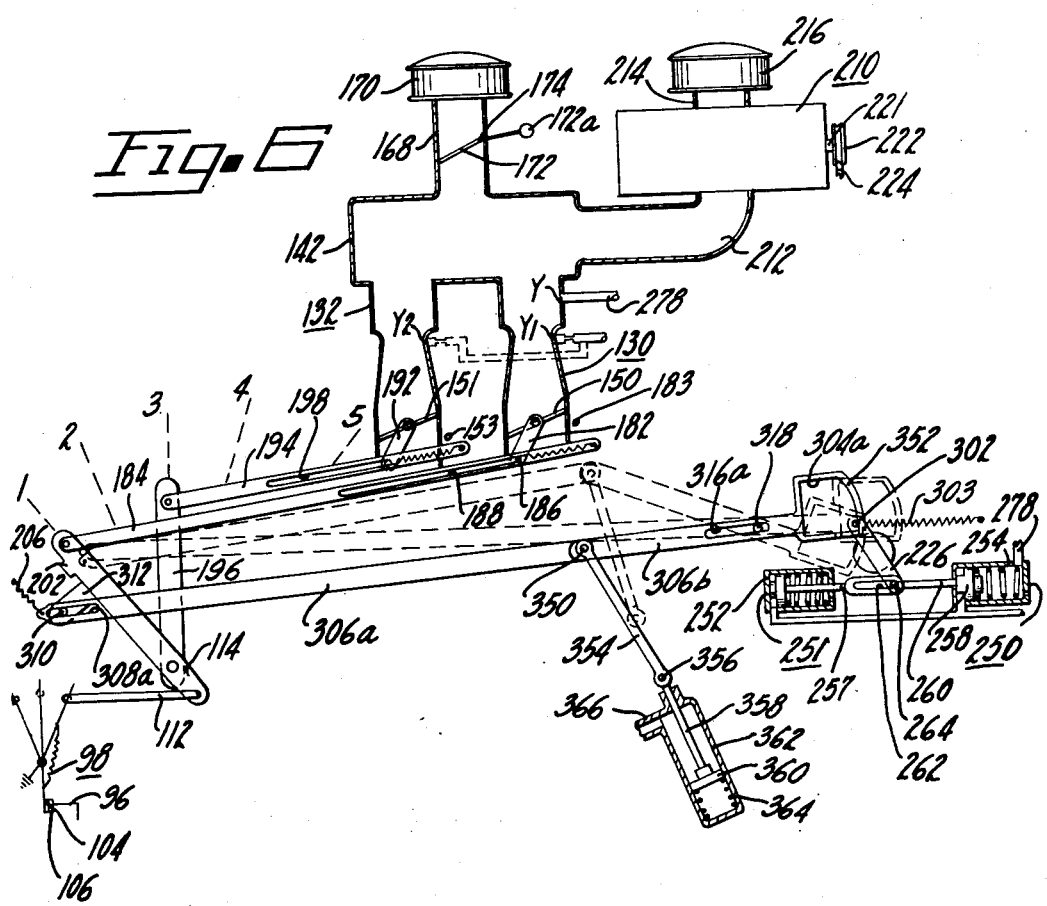

April 11, 1950  A. H. WINKLER ET AL  2,503,930
ENGINE CONTROL MEANS
Filed July 10, 1944  8 Sheets-Sheet 5
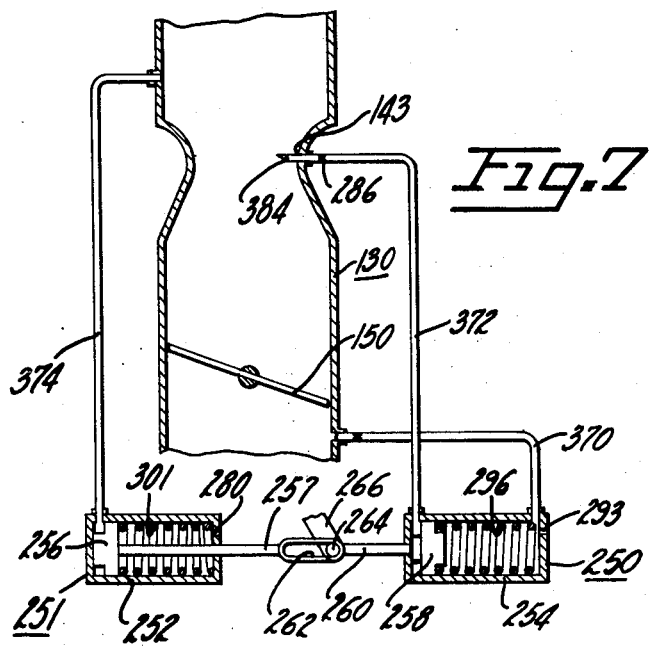
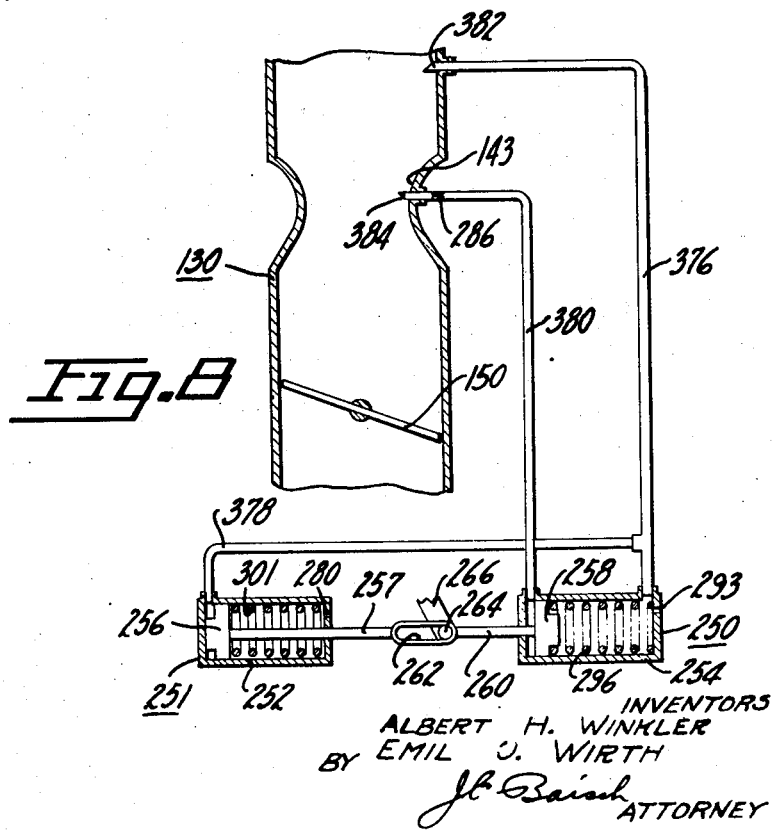
INVENTORS
ALBERT H. WINKLER
BY EMIL J. WIRTH
ATTORNEY

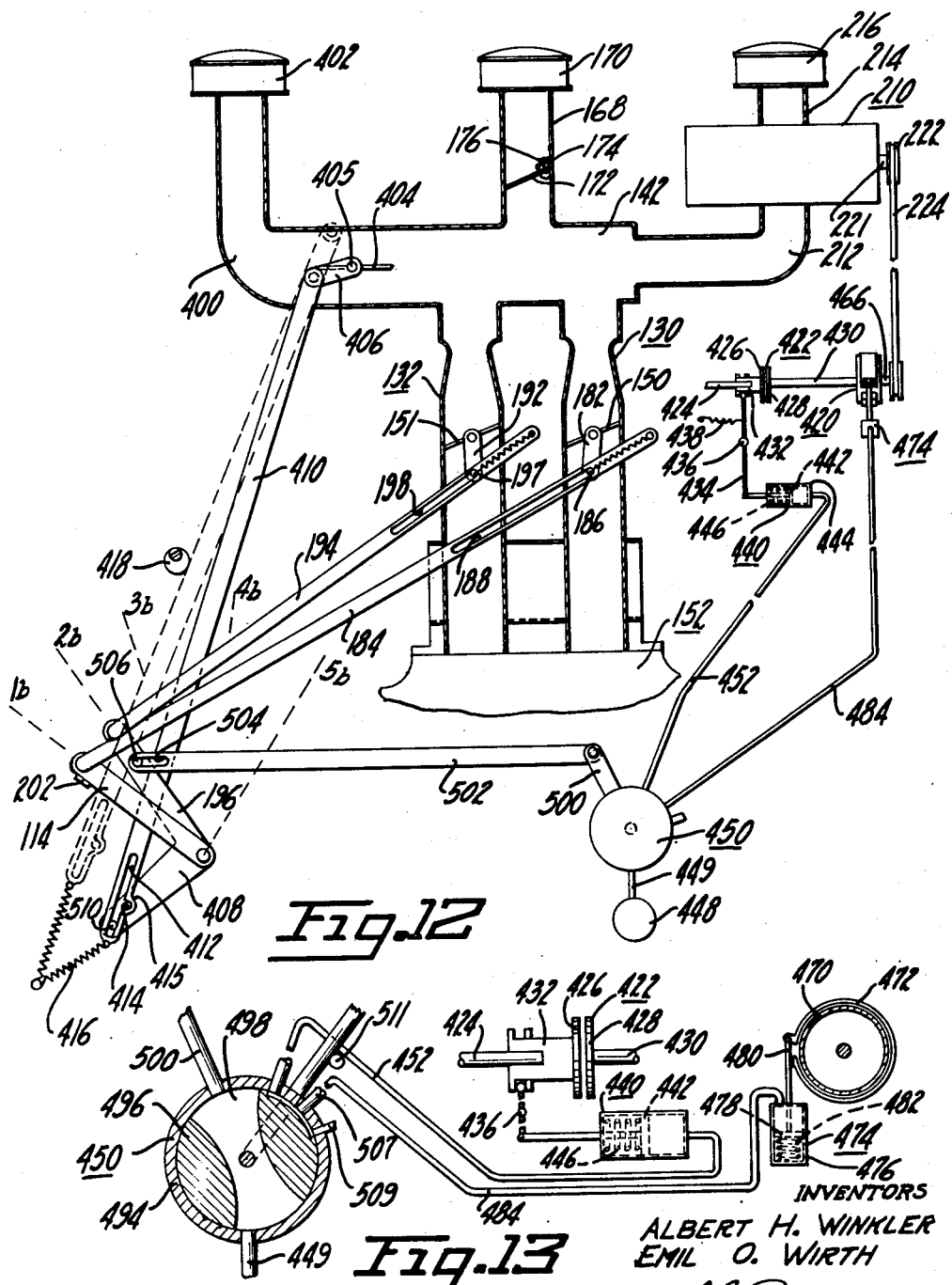

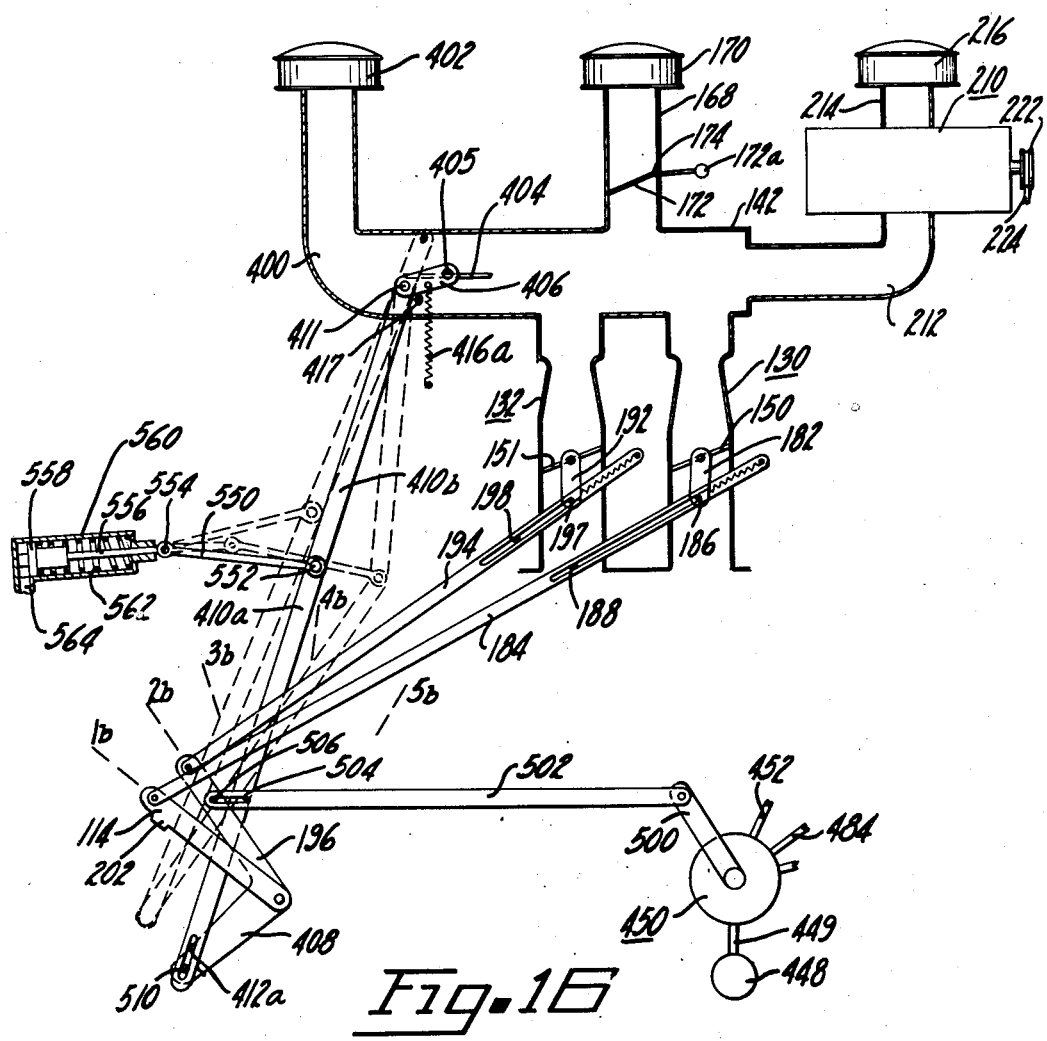

Patented Apr. 11, 1950

2,503,930

UNITED STATES PATENT OFFICE 2,503,930

ENGINE CONTROL MEANS

Albert H. Winkler and Emil O. Wirth, South Bend, Ind., assignors to Bendix Aviation Corporation, South Bend, Ind., a corporation of Delaware Application July 10, 1944, Serial No. 544,266

68 Claims. (Cl. 123—127)

This invention relates to engine control means and more particularly to such control means for providing improved engine performance under various operating conditions.

The internal combustion engines in most present day automotive vehicles must operate throughout a wide range of speed and power and with such an arrangement efficiency in the use of fuel is low during a large part of the time inasmuch as the engine cannot operate in a favorable speed and load range during the greater part of its operating time.

It is therefore an important object of the present invention to provide means for improving the operating characteristics of internal combustion engines and broaden the speed range and partial load operating conditions so that better performance and economy can be obtained.

Another object of the invention is to provide a device of this character wherein the flexibility, efficiency, economy, speed and power of the engine is increased.

The present invention further contemplates the use of a split engine arrangement, by which is meant herein that under certain operating conditions some of the cylinders of a multiple cylinder internal combustion engine are at times cut out or rendered inoperative for producing power and do not draw a fuel charge into the cylinders thus reducing the total fuel consumption of the engine, such cylinders being cut out when the load on the engine is light and relatively little power is required, as when the vehicle in which the engine is installed is being operated with little or no load above its own weight. During heavy load requirements all the cylinders are operating.

The present invention further contemplates the provision of a multiple stage carburetor system by means of which under certain operating conditions fuel mixture is supplied by a single carburetor induction passage for economical operation, and under other operating conditions such mixture is supplied from two or more carburetor induction passages so that the engine will be supplied with a sufficient volume of fuel mixture for increasing its speed and power. It is still further contemplated by the present invention to supply air to the multiple stage carburetor system under superatmospheric pressure, as by a supercharger, so that the engine will develop maximum speed and power.

A further object is to provide means to control the various factors or elements above mentioned so that operation of the engine is smooth throughout its entire range of operation. Various factors may be employed in the control means such as manually actuated means, engine speed, induction system pressures, the mass rate of air flow or volume rate of air flow, electrical means, and/or hydraulic means.

Various problems are involved in combining a split engine arrangement, a multiple stage carburetor system and a supercharger so that the combination will function properly and it is therefore a further object of the invention to provide means for effecting cooperation of the various parts of the device and it is to be understood that the present invention deals with improvement with respect to the entire combination as well as with respect to subcombinations thereof, and to various elements per se.

Novelty also resides in various parts of the means for controlling the split engine system, the multiple stage carburetor system and the supercharger, and various combinations thereof, as well as in the means for controlling entire combinations in accordance with the condition under which the engine is operating.

The characteristics and advantages of the invention are further sufficiently referred to in connection with the following detailed description of the accompanying drawings which represent certain preferred embodiments. After considering these examples, skilled persons will understand that many variations may be made without departing from the principles disclosed, and we contemplate the employment of any structures, arrangements or modes of operation that are properly within the scope of the appended claims.

Referring to the drawings:

Figure 3 is an enlarged detail of the engine valve actuating mechanism;

Figure 6 is a schematic view of an alternative arrangement of a supercharger control system;

Figure 7 is a schematic view of an alternative arrangement of the overcontrol system;

Figure 8 is a schematic view of another alternative overcontrol system;

Figure 9 is a schematic view of still another overcontrol arrangement;

Figure 10 is a view taken on line 10—10 of Figure 9;

Figure 15:
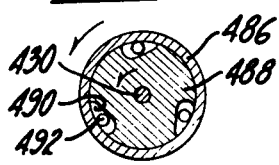
Figure 11:
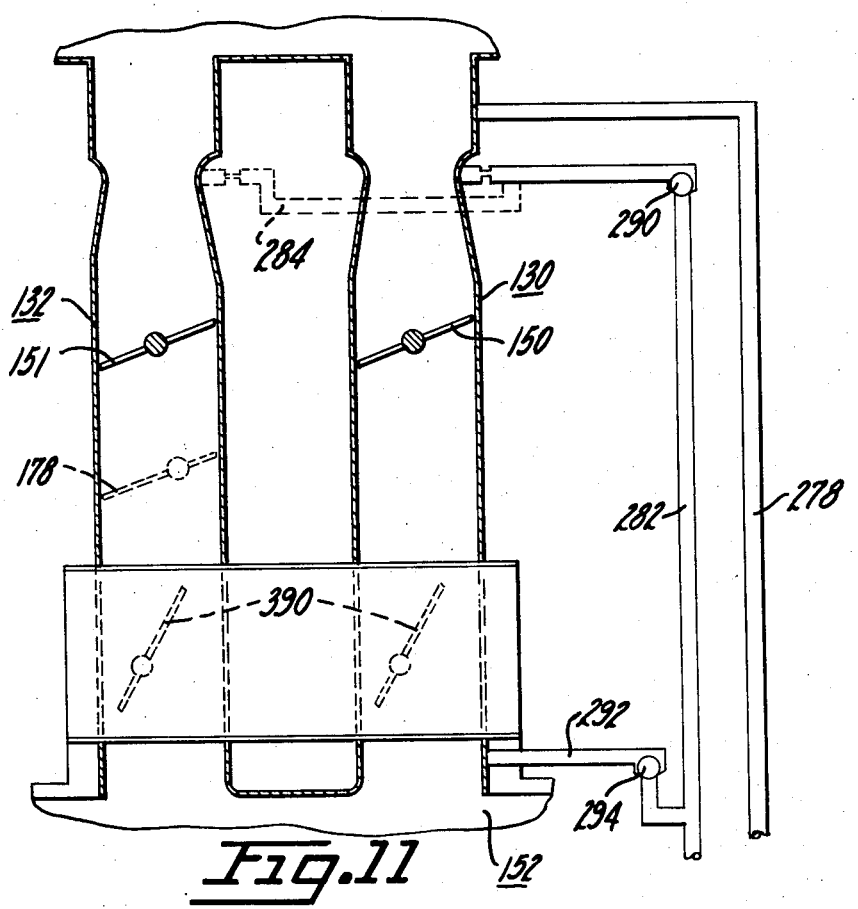
Figure 14:
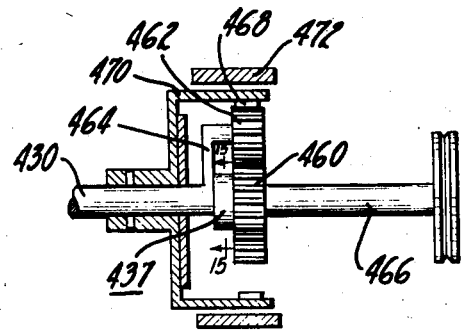

Figure 11 diagrammatically shows an alternative arrangement of the multiple stage carburetor system including governor valves in the induction passages;

Figure 12 is a schematic view of another alternative arrangement of the multiple stage carburetor system, supercharger and controls therefor;

Figure 13 is an enlarged schematic view of the supercharger control means for the embodiment of Figure 12;

Figure 14 is an enlarged schematic view of an epicyclic coupling or transmission for the supercharger in the arrangement shown in Figure 12;

Figure 15 is an enlarged section taken on line 15—15 of Figure 14; and

Figure 16 is an alternative arrangement of the actuating mechanism of the pressure control valve of Figure 12.

Throughout the drawings and specification similar reference numerals refer to similar parts although where such parts are modified in structure and operation they are given a further differing reference character.

In this application a split engine is to be considered one in which a portion of the cylinder, as for example half of the cylinders, function in the normal manner but the remaining cylinders are rendered inoperative, the intake and exhaust valves of said remaining cylinders being continually seated or closed when the engine is "split." With such an arrangement the ignition can be cut out for the latter cylinders or it may remain operative as desired.

Figure 1:
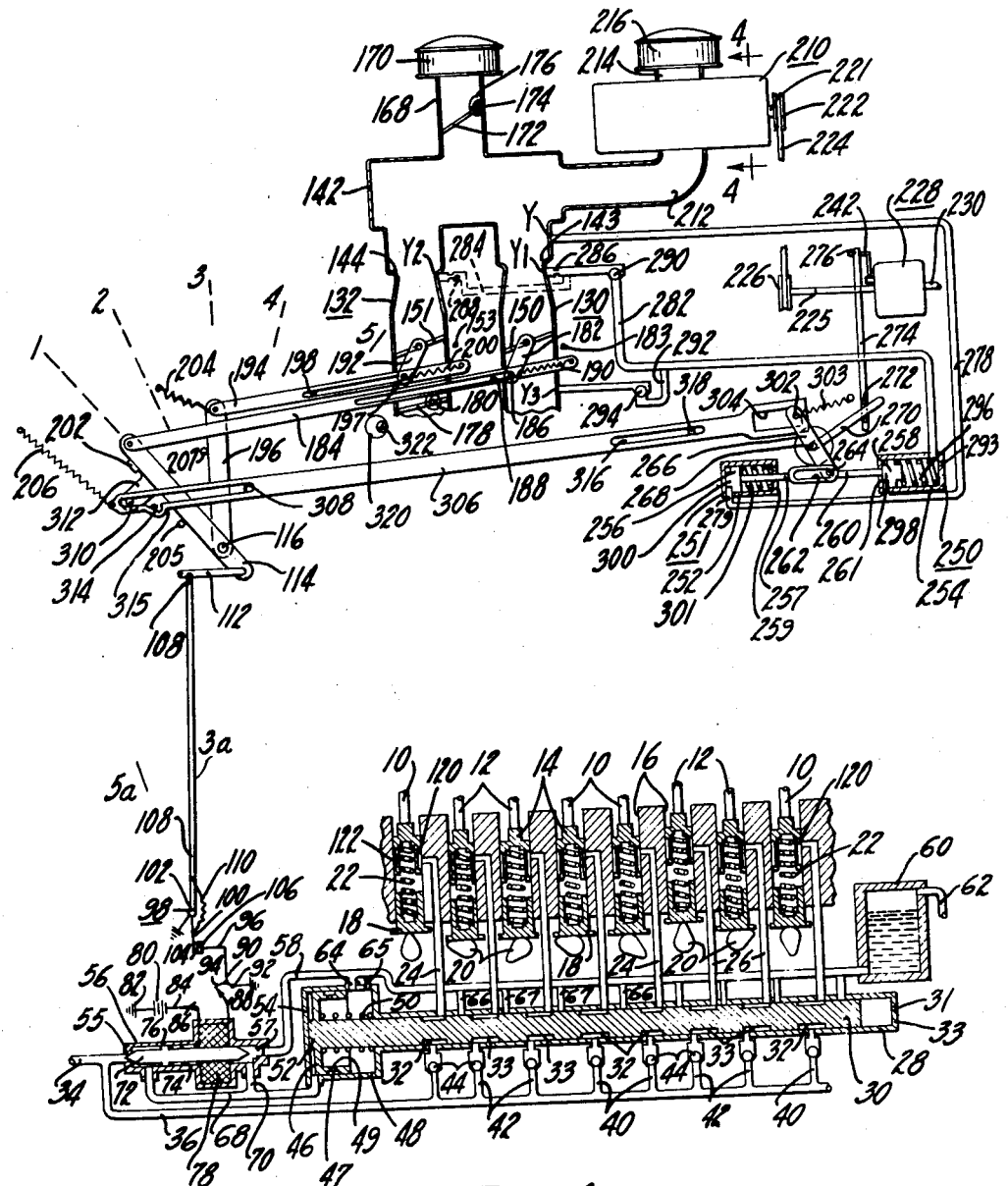
Figure 1 is a schematic view, partially in section, showing an engine control system embodying the present invention.
Figure 4:
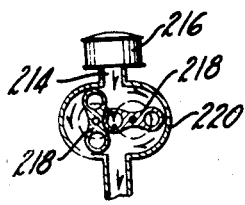
Figure 4 is a section taken on line 4—4 of Figure 1 schematically showing the interior of the supercharger.

Referring first to Figure 1 there is shown diagrammatically a portion of the intake and exhaust valve mechanism for a plural number of cylinders of an internal combustion engine with the controls for cutting said cylinder out or in; a multiple stage carburetor system and controls; and supercharger and the controls thereof. The subject matter shown in Figure 1, principally in the lower half thereof, is claimed in the sole application of Albert H. Winkler, Serial No. 6,527, filed February 5, 1948, as a division of the present case.

*Split engine mechanism*

The split engine contemplated for use in the present arrangement, wherein a portion of the cylinders are adapted to be rendered inoperative for delivering power, preferably should have eight cylinders and under conditions of light load half of the cylinders are rendered inoperative or cut out. However a different number of cylinders may be cut out. Further it is to be understood that this portion of the invention is not to be considered as being limited to an eight cylinder engine, for plural cylinder engines having other numbers of cylinders may be used and any desired number of said cylinders may be cut out as desired or required by the particular installation, the number of cylinders cut out being readily determinable by those skilled in the art.

In the drawings, Figure 1, only a portion of the intake and exhaust valve mechanism of four cylinders is shown, as it is believed to be unnecessary to a full understanding of the invention to show the valve mechanism of all the cylinders, it being understood, of course, that each cylinder is provided with an intake and an exhaust valve and that the group of cylinders not shown are adapted to function at all such times as the engine is operating. In the arrangement of Figure 1 the valves shown are to be considered those of one bank of a V-8 engine and are the valves of cylinders adapted to be rendered inoperative at times, it being understood however that the invention may be embodied in an in-line and in other types of engines.

The valve mechanism and controls therefor herein disclosed, comprise exhaust valve stems 10 and intake valve stems 12 each of which is engaged by a valve pusher 14 slidable in a valve guide 16, said valve pushers being disposed in the upper portion of the respective valve guides, as shown. The lower portion of the guides 16 have respective cam followers 18 disposed therein which also slide in said guide and are engaged by respective cams 20. A spring 22 is provided in each valve guide and reacts between the valve pusher and cam follower urging same apart, said springs being of substantially less strength than the springs of the intake and exhaust valves urging said valves closed. Means is provided for supplying oil to the space in the valve guides between the valve pushers and cam followers, said means comprising conduits 24 for the exhaust valves and conduits 26 for the intake valves. The conduits 24 and 26 are connected with a tube 28 comprising the body of a hydraulic control valve and the points of connection of said conduits 24 and 26 with the tube 28 are spaced longitudinally of said tube. A sliding valve member 30 is disposed in the tube 28 and member 30 is provided with a plurality of annular grooves 32 and 33 therein spaced longitudinally apart relative to the length of the member 30, there being a vent 31 in an end wall 33 of tube 28 to eliminate undesirable pressures between said wall 33 and the adjacent end of the member 30 and thereby prevent interference with reciprocable movements of member 30.

Means for actuating the valve member 30 comprises a piston 46 connected with said member and reciprocably mounted in a cylinder 48, said piston having an annular groove 47 therein and passages 49 which connect the groove with the interior of said piston. A spring 50 urges the piston to the left, as shown in the drawings, and movement of said piston to the left is limited by a longitudinally projecting, reduced diameter portion 52 of the piston head which is adapted to abut against the adjacent end wall 54 of the cylinder thereby spacing the head of the piston from said cylinder end.

In the present showing the engine valve control mechanism also includes means for actuating the piston 46 and oil for actuating said piston is supplied from an oil reservoir, which may be the engine crank case. Such oil is supplied under pressure by an oil pump, not shown, driven by the engine or by any other suitable means, it being understood that other liquids than oil may be used and that other means may be provided for supplying the liquid under pressure either from the crank case or from some other source of supply. The oil is delivered through a conduit 34 which communicates with a conduit 36 having branches 40 and 42 respectively which are connected with the tube member 28, said connections being longitudinally spaced with respect to tube 28. Check valves 44 are provided in each branch conduit 40 and 42 to prevent back flow therethrough. Also included in the means for controlling the engine intake and exhaust valves which are adapted to be rendered inoperative at times, is a solenoid operated valve having a casing 56 with ports 55 and 57 in opposite ends thereof, the port 55 being connected with the conduit 34 and the port 57 being connected with a conduit 58 which communicates with a reservoir 60 having a pipe 62 through which oil is returned to the crank case. The conduit 58 has a branch 64 which communicates with the cylinder 48 behind the piston when the latter is in the position shown in the drawings and a second branch 65 of restricted capacity which communicates with the cylinder adjacent its right hand end, the purpose of this arrangement being hereinafter described. The conduit 58 also has a plurality of branch conduits 66 and 67 which communicate with the tube 28 between the conduits 24 and 26, the connections of conduits 66 with the tube 28 being spaced further from the adjacent connections of conduits 24 than the connections of conduits 67 are spaced from adjacent conduits 26. The cylinder 48 is connected with the valve casing 56 by a conduit 68 which communicates with the left hand end of said cylinder ahead of the piston 46, the conduit 68 being connected to said casing adjacent the left hand end thereof. There is also a branch pipe or conduit 70 from conduit 68 which communicates with the right hand end of said casing.

Within the casing there is a slidable valve member 72 having tapered ends which are adapted to cooperate with the respective ports 55 and 57, said ends being adapted to close said ports in the casing in accordance with the position of said member 72, there being a spring 74 which reacts against a flange 76 of the valve member 72 and urges said member to the left for normally closing the port 55 of the casing 56. A solenoid 78 is mounted in the valve casing 56 and receives the member 72 in a central opening thereof, said solenoid being adapted, when energized, to actuate the valve member 72 to the right for closing the port 57 of casing 56 and opening the port 55.

An electrical control system for the solenoid is provided and comprises a suitable source of power, which is shown as a battery 80, having a ground 82 and a connection 84 with the solenoid in which an ignition switch 86 may be interposed if desired so that the solenoid may be energized only when the ignition is turned on. The solenoid also has a connection 88 with an overcontrol switch, indicated generally at 90, said switch being a manual one, preferably operated from the instrument panel or dash of the vehicle, and is provided with a grounded contact point 92 and a second contact 94 has a wire 96 leading to a snap switch indicated generally at 98. The snap switch includes a lever 100 mounted on a grounded shaft 102 and carrying a contact 104 adapted to engage a contact 106 to which wire 96 is connected. An actuating lever 108 is rotatable relative to the axis of the shaft 102 whereby there may be relative movement between the lever 100 and lever 108, a spring 110 providing a resilient connection between the said levers 100 and 108, the latter being connected adjacent its free end to a rod 112 connected to a lever 114 fixed to a shaft 116 which is adapted to be connected to the usual conventional manually actuated accelerator pedal, not shown, which is adapted to effect rotation of the shaft 116 and thereby effect operative movement of the lever 114.

The overcontrol switch 94 is preferably operated from the dash to provide means for manually cutting out the cylinders or rendering them operative, or connecting the solenoid with the mechanical acting solenoid switch 96 which is controlled in connection with the control mechanism for the carburetor throttle valves and the supercharger as will be hereinafter described.

*Operation of the split engine mechanism*

With the parts of the split engine control mechanism in the positions shown in Figure 1, and oil filling the various conduits above described, the general operation of the device is as follows: Oil under pressure is delivered by the engine oil pump through pipes 34, 36 and branch pipes 40 and 42, thence through grooves 32 in the member 30 to the pipes 24 and 26 for the exhaust and intake valves respectively. The conduits 24 and 26, being connected with the interior of the valve guides 16 as best shown in Figure 10, deliver oil into said guides between the valve pushers 14 and the cam followers 18, the oil from said conduits 24 and 26 being delivered into annular grooves 120 of the valve pushers 14 and thence into the interior of said pushers by way of ports 122. The grooves 120 are of such length and so associated with the adjacent ends of the conduits 24 and 26 that communication between the conduits 24 and 26 and respective valve guides is provided at all times. The spring 22 normally urges the pusher and cam follower apart and when oil under pump pressure fills the space between said pushers and followers the valves will be actuated by the cams 20 and function in the normal manner.

Should it be desired to cut out certain of the cylinders the solenoid 78 is energized and thereupon moves the plunger 72 to the right thereby opening the port 55 of the casing 56 and closing the port 57 thereof. Oil under pressure then is transmitted from conduit 34, through the left hand end of casing 56 and to conduit 68, thence into the cylinder 48 ahead of the piston 46. The pressure of oil forces the piston 46 to the right which effects movement to the right of the member 30, the rate of such movement being determined by the rate the oil can flow from the cylinder 48 behind said piston. As the piston moves to the right oil behind it escapes from the cylinder through the passages 64 and 65, the movement of the piston being rapid until it passes and closes passage 64, due to the fact that the combined areas of passages 64 and 65 permit a rapid discharge of the liquid from the cylinder behind the piston. When piston 46 cuts off the flow of liquid into passage 64 the rate of piston travel is substantially reduced as the flow through passage 65 is restricted. Then, when groove 47 comes into communication with passage 64, as the piston continues its rearward movement at a reduced rate, the rate of flow from the piston increases due to the escape of oil from the cylinder through orifices 49, groove 47 and passage 64 as well as passage 65 the piston travel becomes rapid until said piston reaches the end of its rearward stroke or movement to the right, the purpose of this arrangement being hereinafter described.

Referring to the grooves 32 and 33 in the member 30, it is to be noted that they are so arranged that when the member 30 is at its limit of movement to the right the conduits 40 communicate with the grooves 32 substantially centrally relative to their ends and the conduits 24 communicate with the grooves 33 adjacent the left ends thereof. The conduits 24 and 26 communicate with the respective grooves 32 and 33 adjacent their right hand ends. Therefore when the member 30 is moved to the right to its limit of movement the conduits 40 and 42 are cut off from communication with the respective grooves 32 and 33 and said grooves then provide communicating means between the conduits 24, 26 and 66 and 67 respectively whereby the oil between the valve pushers and cam followers of the intake and exhaust valves escapes through the conduits 24, 26 and 66 and 67 and is carried to the reservoir 60 through the pipe 58. Thereafter the cam followers are actuated by the cams but are incapable of transmitting pressure through the oil to the valve pushers. Thus the cylinders of one bank of the engine are rendered inoperative inasmuch as they cannot be charged with fuel mixture from the carburetor, the other bank of cylinders being, of course, operative in the usual manner. It is to be understood of course that some cylinders may be cut out in each bank of a V-8 engine, the cylinders to be cut out being readily determinable by those skilled in the art said cylinders being selected in accordance with the particular characteristics of crankshaft structure and firing arrangement.

When the solenoid 78 is deenergized spring 74 moves the plunger 72 to the left for closing the port 55 and opening the port 57 of the casing 56. Spring 50 then urges the piston 46 to the left and oil ahead of the piston is forced out through the conduits 68, 70, the right side of the casing and into the pipe 58 which delivers it to the reservoir 60 and thence it is returned to the crank case of the engine. The speed of travel of the piston is determined largely by the rate that oil is allowed to enter the cylinder behind the piston.

In order to prevent excessive pressure building up in the cylinders which are cut out, the exhaust valves thereof should operate a little longer than the intake valves when said cylinders are being cut out, and said exhaust valves should begin operation before the intake valves when bringing the cylinders back into operation. This is effected by the proper spacing of the conduits 24, 26, 66, 40 and 42 relative to the tube 28 and the grooves 32, as above described, and when the member 30 is actuated to the left the sequence of operations is as follows: The grooves 33 connect the conduits 26 and 67 together before the conduit 42 is cut off. There is then a time lapse before grooves 32 connect conduits 24 and 66 together. After the latter connection is made the conduit 40 is cut off. Thus the pressure in the valve guides for the intake valves is relieved earlier than the pressure in the guides for the exhaust valves. Further, as the first portion of the movement of the member 30 is extremely rapid there is a quick relief of oil pressure in the intake valve guides and consequently a quick rendering of the intake valves inoperative. As subsequent movement of member 30 to the right is at a reduced speed there is sufficient delay in rendering the exhaust valves inoperative to prevent building up of excessive pressure in the cylinders of the engine which are being cut out. The latter portion of the movement to the right of the member 30 is rapid and occurs after the exhaust valves have been cut out.

Return movement of member 30 (movement to the left) occurs in reverse sequence to that above described and the first portion of the movement is relatively rapid, followed by movement at a slower rate during the time the exhaust valves are rendered operative, the connection between the conduits 24 and 66 being broken before the connection between the conduits 26 and 67 and oil is supplied to the exhaust valve guides before it is supplied to the intake valve guides. After the exhaust valves are rendered operative the intake valves are rapidly brought into operation.

While the foregoing arrangement is preferred it is to be understood that the invention is not limited thereto for other arrangements may be provided within the spirit and scope of the inventive concept in its broader aspects.

Carburetor system

Figure 2:
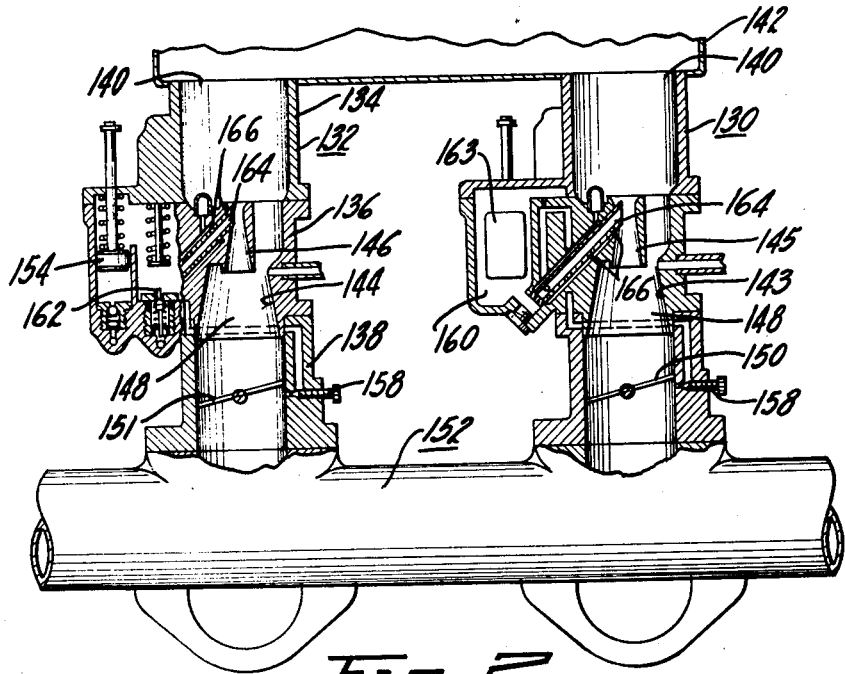
Figure 2 is an enlarged partial section of a multiple stage carburetor system in which the carburetors are shown schematically and are attached to the manifold of an internal combustion engine to which both carburetors deliver fuel mixture.

While a single stage type of carburetor may be used the carburetor system of the present invention is preferably of the multiple stage type, and as shown comprises a plurality of carburetors indicated generally at 130 and 132, Figures 1 and 2, although an integral carburetor having a plurality of induction passages may be used. Each carburetor comprises an air horn section 134 a body section 136 and a throttle body section 138. The induction passages of the carburetors each has an air entrance 140 communicating with a casing 142 from which air is supplied to said induction passages. In the arrangement as shown the carburetor 130 is the primary carburetor and the carburetor 132 is the secondary one and the respective primary and secondary induction passages respectively include large venturis 143 and 144, small venturis 145, 146, mixture passages 148 and throttle valves 150 and 151 controlling the flow of mixture through the respective mixture passages. The carburetors may deliver fuel mixture to a plurality of intake manifolds although as shown they deliver fuel mixture to a single intake manifold 152 and said carburetors are preferably provided with the usual conventional acceleration pumps 154, economizers 162 controlled with the throttle or by any other well known means, and idling systems 158. Fuel as supplied to the carburetors from any suitable source to the fuel chambers 160 which have the usual float mechanisms 163 and the fuel is delivered from the fuel chambers to the small venturis by means of main fuel nozzles 164 having air bleeds 166. Air may be supplied to the casing 142, Figure 1, through an air passage 168 having the usual air filter 170 connected to its intake end. An unbalanced flap valve 172, for preventing backflow of air in passage 168, is pivoted on a shaft 174 and is adapted to permit the flow of air through said air passage 168, the valve 172 being normally closed by a spring 176 and is openable by the flow of air through the passage 168. If desired the secondary or second stage carburetor may be provided with an offset valve 178 posterior to the throttle valve 151 thereof which is adapted to function in a manner similar to that disclosed in the Wirth Patent No. 2,420,925 for a Charge forming device, issued May 20, 1947, the valve 178 being urged closed by a spring 180.

Throttle valve control means

The primary throttle valve 150 is provided with a throttle lever 182 which in turn is connected to the free end of lever 114 by means of a rod 184, there being a pin, 186, and slot, 188, connection between the throttle lever 182 and rod 184, with a spring 190 so connected to the rod and pin that the pin is normally but yieldingly held at the right hand end of the slot 188. The secondary throttle valve 151 is provided with a throttle lever 192 which is connected by a rod 194 with the free end of a lever 196 rotatably mounted on the shaft 116. There is also a pin, 197, and slot, 198, connection between the throttle lever 192 and the rod 194 and a spring 200 is so connected to the rod 194 and pin 197 that said pin is normally but yieldingly positioned at the right hand end of the slot 198. A spring 204 provides yielding means for returning lever 196 to position 3 and stops 205 and 207 limit counterclockwise movement of levers 114 and 196 respectively.

Supercharger and driving coupling

Incorporation of a supercharger system is also contemplated by the present invention and comprises a supercharger 210 having a discharge passage 212 connected with the casing 142. An air inlet passage 214 is provided for the supercharger and the inlet end thereof is provided with the usual air filter 216. The supercharger may be of any well known type but as shown comprises a Root-type blower in which impellers 218 are rotated in a casing 220 in the well known manner to provide air under superatmospheric pressure to the carburetors. The supercharger drive shaft 221 is provided with a pulley 222 connected by a belt 224 with a pulley 226 on a shaft 225 of a variable speed transmission or coupling indicated generally at 228 which may be connected by a shaft 230 to any suitable rotating part of the engine either directly, through belts or through a chain of gears, in any well known manner.

Figure 5:
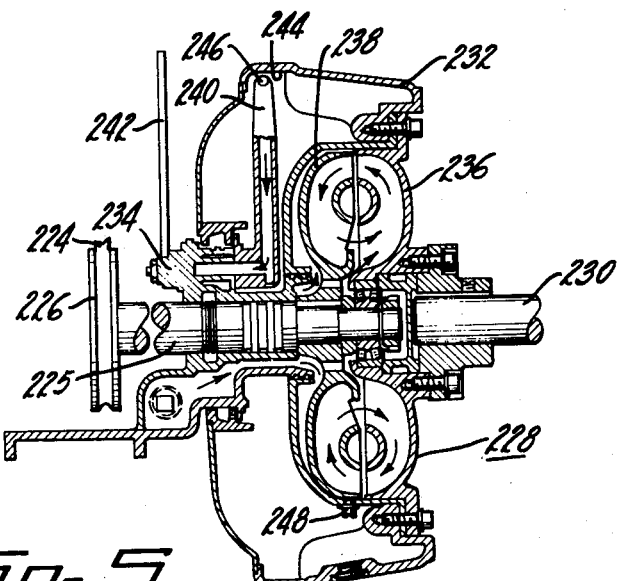
Figure 5 is an enlarged schematic section through the coupling for the supercharger in the arrangement shown in Figure 1.

The coupling or transmission 228 may be of any well known type but as shown comprises a scoop controlled hydraulic coupling having an outer oil reservoir or casing 232 adapted to rotate on a stationary member 234. An impeller 236 is connected to the driving shaft 230 and a runner 238 is connected to the driven shaft 225, on which the pulley 226 is mounted. A scoop tube 240 is eccentrically mounted on the stationary member 234 and is pivoted so that it can swing through an arc about its pivot point, said scoop being actuated by a control lever 242 which is connected therewith. The outer casing 232 serves as an oil reservoir for retaining the oil that is not required in the circuit to transmit power at any particular speed setting. When the casing is rotating, centrifugal force holds the oil in an annular ring 244 formed in the casing and with the scoop tube tip in its outermost or full dip position, as shown in Figure 5, and held stationary, the scoop picks up substantially all of the oil in the outer casing 232, the oil entering the scoop through an opening 246 and carrying it through openings in the stationary member 234 and thence into the working system for transmitting maximum power, the oil following the course indicated by the arrows in Figure 5. When the scoop tube is set in its fully retracted position the free end is completely out of the annular ring 244 of the casing and no oil is delivered to the working circuit. Leakoff nozzles 248 allow a constant flow of oil from the working circuit to the outer casing and as no replacing oil is received from the scoop tube when in the retracted position, the working circuit empties and power transmission ceases. With the scoop tube in any intermediate position between full dip and fully retracted it leaves in the other casing a rim of oil of varying thickness depending on the various positions of the scoop tube with relation to the outer casing oil and the position of the scoop tube therefore determines the amount of oil in the working circuit and therefore the output speed and power of the coupling.

Supercharger control

The control of the coupling and therefore the control of the supercharger from zero speed to maximum speed, in conjunction with the throttle valve controls, comprises a lever 266 pivoted intermediate its ends at 268. A lateral extension 270 is provided on lever 266 and extends radially of the axis 268. The free end of lever 270 is operably received between a pair of spaced pins 272 fixed to a rod 274 connected at 276 with the lever 242 of the coupling 228. The arrangement is such that rotation of lever 270 will effect rotation of lever 242 for varying the position of the scoop 240 and thereby effecting variations of the speed and power output of the coupling, rotation of lever 266 in a clockwise direction being adapted to initiate power transmission and increase the output speed of the coupling and counterclockwise rotation being adapted to decrease said output speed and halt power transmission at its limit of counterclockwise movement as shown in Figure 1.

Clockwise rotation of lever 266 is effected by a spring 303, said rotation being limited by a rod 306 which has a slot 304 in one end in which is received a pin 302 attached to lever 266 adjacent one end thereof. The rod 306 has a second slot 308 adjacent the left hand end in which is slidably received a pin 310 fixed in an extension 312 of lever 114. The slot 308 also has a notch 314, the purpose of which will be hereinafter described. It is to be noted that the rod or link 306 is also provided with a slot 316 in which is received a pin 318 which may be fixed to any suitable adjacent stationary part and which serves as a guide for the link 306. A stop member 320 is provided above the link 306, as shown in the drawings, and is eccentrically mounted at 322 to any suitable fixed member, thereby providing adjusting means for the stop 320 with respect to the adjacent side of the link or rod 306.

Operation of the above described arrangement

When the levers 114 and 196, the supercharger coupling control mechanism and the split engine control mechanism are in the positions shown in Figure 1 and the switch 90 is positioned to connect wires 88 and 96 together (assuming the engine is running) both primary and secondary throttle valves are in the idling potion, the supercharger is inoperative and the engine is operating on a portion only of its cylinders.

Depression of the accelerator pedal will effect clockwise rotation of the lever 114 for opening the throttle valves and as said lever is moved from position 1 to position 2 the primary throttle valve 150 will be opened, said valve being fully opened when the lever 114 reaches position 2. It is to be understood that the spring 190 is of sufficient strength to retain pin 186 at the right hand end of slot 188 as lever 114 is moved throughout the range from position 1 to position 2. When the primary throttle valve 150 reaches its fully open position it is held against further movement in the same direction by any well known means such as a stop 183 against which the primary throttle lever 182 is adapted to abut.

When the throttle valves are at idling and at all other times that the supercharger is inoperative air is taken into chamber 142, and thence into the carburetor induction passages, through the air passages 168, the valve 172 then being opened by air flow through the latter passage. However when the supercharger is in operation and is delivering air at atmospheric pressure the valve 172 is closed by spring 176 and said superatmospheric air pressure and all the air is supplied to the carburetor induction passages through the supercharger.

As the lever 114 moves from position 1 to position 2 the pin 310 moves into notch 314 due to the fact that a spring 206 is provided which is so connected to the adjacent end of rod 306 that it exerts an upward force on said end of rod 306 as well as a longitudinal pressure thereon tending to move rod 306 to the left, and as the configuration of notch 314 is such as to provide an abutting shoulder 315 which pin 310 is adapted to engage for positive actuation of the rod 306 to the right when lever 114 reaches position 2, further clockwise movement of lever 114 beyond said position 2 will effect movement of rod 306 to the right. Therefore, as lever 114 moves from position 2 to position 3, and rod 306 is positively moved to the right, spring 303 effects actuation of lever 266 so that power is transmitted through coupling 228 and the supercharger is operated, said coupling having minimum slippage and the supercharger is operating at maximum R. P. M. for that given engine speed when the lever 114 reaches position 3. Also as lever 114 moves from position 2 to position 3 the spring 190 yields, permitting the pin 186 to slide in slot 188. At this time the left hand end of rod 306 has been raised by the upward movement of pin 310 as lever 114 is rotated, and contacts stop 320 so that further clockwise rotation of lever 114 will cause the pin 310 to move out of notch 314 and spring 206, which is stronger than spring 303, will cause the rod 306 to snap to the left and cut out the supercharger.

It is to be noted that as lever 114 is rotated in the clockwise direction lever 108 of the split engine control is moved in a counterclockwise direction and when the lever 114 passes position 3 lever 108 passes position 3a causing spring 110 to pass across the axis 102 of levers 108 and 100 and effect sudden clockwise movement of the latter to break the solenoid circuit. This results in the bringing into operation the cylinders of the engine heretofore inoperative and the engine then operates upon all its cylinders in the normal manner.

When the lever 114 is moved clockwise beyond position 3 a lug 202 picks up and moves lever 196 in the same direction for opening the secondary throttle valve 151 which is fully opened when said levers reach position 4, at which time throttle lever 192 contacts stop 153 to limit further movement of said lever and valve and thereafter, with further clockwise movement of lever 114 and 196 the spring 200 yields and pin 197 slides in slot 198. When the levers 114 and 196 are at said position 4 pin 310 has reached the right hand end of slot 308 and movement of said levers from position 4 to position 5 brings in the supercharger and controls its speed in a manner similar to that above described.

Return movement of the lever 114 is effected by the spring, not shown, of the accelerator pedal mechanism which is strong enough to effect such movement against any opposing force in the mechanism and when said levers and lever 196 are moved from position 5 to position 4 the supercharger speed is reduced accordingly and when said position 4 is reached the supercharger is cut out entirely. Thereafter counterclockwise movements of the levers to their limits of movement, as shown in Figure 1, progressively and successively, close first the secondary valve 151 and then the primary valve 150. It is to be noted that the snap switch 98 will not return to its closed circuit position until the lever 114 has rotated counterclockwise beyond position 3.

While the above arrangement for controlling the valves of the engine is disclosed, other means may also be used such as vacuum controlled means or the like.

*Automatic overcontrol for the supercharger*

It is generally undesirable to have the supercharger operate above certain relative speeds in relation to engine speed in order to prevent detonation, such speeds varying with the type of supercharger and the installation, and since the supercharger is driven through a hydraulic coupling which may drive the supercharger at such speeds that the resulting pressure built up in the induction system will cause detonation, it is desirable to provide overcontrol means for regulating or controlling the speed and resulting pressure output of the supercharger. Also the induction system pressure curve characteristics throughout the speed range may vary for different types of engines and operating conditions so means for modifying the pressure curve is desirable and is included in said overcontrol means.

One means for preventing the building up of intake manifold pressure above a predetermined maximum is a relief valve set to open at or just above the maximum manifold pressure. However, in such an arrangement, there is a wasteful blow off of air. Therefore, in order to limit the speed of the supercharger and also limit the maximum pressure in the intake manifold system without waste, the present invention provides a supercharger speed regulator, indicated generally at 250, and a maximum pressure regulator, indicated generally at 251. Both regulators are overcontrol devices with respect to the manual control and as shown are pressure responsive, as hereinafter described although other suitable types of controls may be used for controlling the supercharger speed and/or pressure.

The speed regulator comprises a cylinder 254 in which a piston 258 is reciprocably mounted. A rod 260 is fixed to the piston and extends through a cylinder wall 261. The rod 260 is provided with a slot 262 adjacent its outward end and in which is received a pin 264 fixed to the lever 266 adjacent the end opposite that in which pin 302 is fixed. The piston 258 is urged to the left by a calibrated spring 296 and is limited in its leftward movement by an enlarged portion 298 on the rod 260 which portion 298 engages wall 261 and spaces the adjacent end of the piston from said wall to provide a space which is connected by a conduit 278 with the air inlet of the primary induction passage at Y, anterior to the venturis and throttle valve. The opposite end of the cylinder is connected with a conduit 282 which communicates with a venturi in the primary induction passage at Y1, the conduit 282 being provided with a branch conduit 284 which communicates with a venturi in the secondary induction passage at Y2. While the conduits 282 and 284 are shown connected with the large venturis in the respective induction passages they may alternatively be connected to the small venturis if desired. Conduits 282 and 284 have restrictions 286 and 288 respectively therein and, to prevent back bleeding in said conduit 282, a check valve 290 is provided therein between the junction of passage 284 therewith and the cylinder 254, it being understood that the restrictions 286 and 288 are between the valve 290 and the respective induction passages with which said conduits are connected. There is also a branch conduit 292 connected with the conduit 282, the former being connected at Y3 with the primary induction passage posterior to the throttle valve thereof, the juncture of conduit 292 with conduit 282 being between the valve 290 and the cylinder 254. A check valve 294 is also provided in conduit 292, to prevent back bleeding therethrough. However in order to permit the piston 258 to be actuated to the left a calibrated bleed 293 is provided in the cylinder. This bleed is calibrated so that it will not interfere with the actuation of said piston by induction passage pressures and it is to be understood that the bleed may alternately be in any suitable place in conduit 282 or across the piston 258.

The pressure regulator comprises a cylinder 252 in which a piston 256 is operably disposed. Piston 256 has a rod 257 which slidably extends through and outwardly of a wall 259 of the cylinder, said rod having a slot 262 into which the pin 264 of lever 266 extends, it being understood that the slotted portions of rods 257 and 260 lie adjacent and substantially parallel to each other, as best shown in Figure 14, and that said rods are movable independently of each other. A calibrated spring 301 urges piston 256 to the left and an extension 300 on the head of said piston limits the spring urged movement thereof by contact with the adjacent wall of the cylinder thus providing a space ahead of the piston, which space is connected with conduit 278 by a branch conduit 279. A vent 280 is provided in cylinder wall 259 to relieve pressure behind the piston and permit proper functioning thereof.

*Operation of the regulators*

The connections of the speed regulator with the induction passages of the carburetors are such that the device is controlled by the differential of pressures at Y and Y1, one factor in the control being the volume rate of air flow through the induction passages. More specifically when the lever 114 is in position 1 the throttle valves 150 and 151 are closed and rod 306 is at its limit of movement to the left. At this time the pressures at Y and Y1, and consequently the pressure behind the piston 258, vary little from atmospheric pressure. However the pressure posterior to the throttle 150 is substantially lower than atmospheric pressure and is transmitted to cylinder 254 ahead of piston 258. As a result the piston is moved against the force of spring 296 and the rod 260 is moved to the right to its limit of movement so that the extreme outer end of slot 262 of said rod moves to position adjacent pin 264 of lever 266. At this time piston 256 in the pressure control device 251 remains in the position shown in Figure 1.

Should the lever 114 be moved suddenly in the clockwise direction to a position between positions 2 and 3 the throttle valve 150 of the primary induction passage will be fully opened and the rod 306 will be moved to the right. At this time the engine speed will be low so that little air will flow through the venturi 143 of the primary induction passage. The pressures at Y1 and Y3 will be somewhat below atmospheric but not a great deal below said atmospheric pressure. Also the pressures at Y and Y2 will not be appreciably below atmospheric. Thus the spring 296 will tend to move the piston 258 to the left and as the pressures tending to move said piston to the right are slight, the spring 303 will actuate lever 266 to effect a transmission of power through the coupling 228. As the supercharger starts to operate the pressure builds up rapidly in the chamber 142 and in the secondary induction passage and the inlet portion of the primary induction passage. Should the speed of the supercharger increase too rapidly and reach the desired maximum induction system pressure for that engine speed pressure at Y will build up and be transmitted by way of conduit 278 to cylinders 254 and 252 so that the piston in said cylinder 252 will be moved to the right against the tension of the spring 301. The action of said piston will cause the left hand end of the slot 262 in the rod 257 to engage the pin 264 of lever 266 and force movement of said lever counterclockwise to effect reduction in the supercharger speed and consequently the pressure of the air delivered by said supercharger will be reduced or held at the proper value.

The maximum induction system pressure controlled by the regulator 251 may be modified at different mass air flows by the regulator unit 250. Thus with the throttle valve 150 open, the valve 151 closed and the engine speed relatively high, the difference in pressure in the air inlet of the primary carburetor and the pressure in the venturi 143 will be substantially less than under the conditions above described and the pressure in the inlet of the primary induction passage will be substantially lower than under said conditions. The pressure at Y1, as modified by the pressure at Y2 which will result in bleeding air through conduit 292, will be substantially below atmospheric pressure and will effect movement of piston 258 to the right and modify the supercharger speed with respect to the manually controlled position to prevent excessive speed of the supercharger with its consequent excessive air pressure delivery.

Comparable conditions and functioning of the arrangement shown in Figure 1 will occur when the secondary throttle valve is actuated in addition to the primary valve. However the operation of the regulators will be somewhat modified by the air flow through the secondary induction passage so that the pressures at Y2 will modify the action of said regulators. The use of the connection to the secondary venturi is optional and may be used or eliminated depending upon the action desired in the particular installation. However the regulators will similarly prevent excessive speeds of the supercharger and the development of excessive air pressures to the carburetor induction passages and the engine.

The above overcontrol means for controlling or regulating the pressure in the induction system is responsive to mass rate and air flow in said induction system for controlling the speed ratio between the engine and the supercharger. However other overcontrol means may be used such as a centrifugal governor or electrical means connected with the generator of the car, for example. Other alternatives of the overcontrol system will be described hereinafter.

The control means of Figure 6

The alternative supercharger control means shown in Figure 6 includes a toggle linkage comprising rods 306a and 306b pivoted together at 350. The rod 306a is provided with a slot 308a, adjacent its free end, slidably receiving the pin 310 of lever 114 therein, and the rod 306b has a guide slot 316a slidably receiving pin 318 therein. The free end of rod 306b has a large slot 304a defined adjacent the outer end thereof by a side member 352 of arcuate shape normally limiting clockwise rotation of lever 266, the pin 302 being adapted to slide on the inner surface of member 352 when the rod 306b is swung on pin 318 as hereinafter described. A rod 354 is rotatably attached, adjacent one end to the pivot 350 and the opposite end is pivotally attached at 356 to a piston rod 358 secured to a piston 360 slidably mounted in a cylinder 362. The piston 360 is urged by a spring 364 in a direction to move the rod 358 outwardly and said piston is adapted to be urged in the opposite direction by oil pressure or the like transmitted to the cylinder 362 through a conduit 366 which is connected to a source of control oil pressure. In the present arrangement the conduit 366 is adapted to be connected to conduit or pipe 68, shown in Figure 1, although it may be connected to any other suitable source of oil pressure controlled in the required manner as hereinafter described. In this view, Figure 6, it should be noted that the valve 172 is yieldingly urged in the closing direction by a weight 172a.

Operation of the control means of Figure 6

The operation of the throttle valves is the same as above described in connection with those of Figure 1. With this in mind the supercharger control functions as follows in relation to the control of the throttle valves:

When the engine is operating on a portion only of its cylinders and the lever 114 is at position 1 the oil under pump pressure is present in conduit 68 and a portion of said oil is transmitted through conduit 366 to the cylinder 362 for positioning the piston 360 adjacent the lower end of said cylinder 362 so that the rods 306a and 306b are in their full line position as shown. Clockwise movement of lever 114 from position 1 to position 2 effects opening of the primary throttle 150 and moves the pin 310 to the inner or right hand end of slot 308a. Movement of lever 114 beyond position 2 will then effect movement to the right of the rods 306a and 306b, the rod 354 swinging on pivot 356 so that the end pivoted at 350 will follow the movement of the rods 306a and 306b which are retained in substantially longitudinal alignment. When the lever 114 has reached position 3 the supercharger is operating at its maximum speed for the prevailing engine speed. Slight additional clockwise movement of lever 114 will cause the snap switch 98 to be opened so that solenoid 88 will be deenergized and the oil pressure cut off from the conduit 68, the pressure being relieved as the oil in conduit 68 escapes through the return conduit 58. The engine now operates in the normal manner with all the cylinders functioning and the spring 364 in the cylinder 362 forces the piston 360 upwardly so that the rods 306a and 306b assume the upper dotted line position, rod 306a pivoting on pin 310 and rod 306b pivoting on pin 318. Due to the fact that spring 364 is stronger than spring 303 counterclockwise movement of lever 266 is effected and the supercharger is cut out. At the same time the rod 306a moves to the right so that the pin 310 is positioned away from the inner end of slot 308a and movement of lever 114 beyond position 3 will not immediately effect starting of the supercharger. At position 3 lever 114 picks up lever 196 and movement of said levers between position 3 and position 4 effect opening of the secondary throttle valve which is fully opened when the said levers are at position 4. At this time pin 310 is again moved to the inner end of slot 308a. Thereafter further movement of the levers 114 and 196 in a clockwise direction effects starting of the supercharger which reaches its maximum speed relative to the prevailing engine speed when said levers reach position 5. Movement of levers 114 and 196 in a counterclockwise direction from position 5 effect a reversal of the above described sequence of operations, and it is to be noted that with this arrangement there is a smooth transition from one stage to another as the lever 114 is moved from position 1 to position 5 and back to position 1.

Alternative overcontrol arrangements

In the alternative overcontrol arrangement shown in Figure 7 the right hand end of cylinder 254 is connected by a conduit 370 to the induction passage of the carburetor 130 posterior to the throttle valve. The left hand end of said cylinder is connected by a conduit 372 with the venturi 143 and the left hand end of the cylinder 252 is connected by a conduit 374 with the air inlet of the primary carburetor 130.

The speed of the supercharger is controlled by this arrangement in accordance with the pressures posterior to the throttle and the pressures in the venturi. This control is modified by the unit 251 in accordance with the air inlet pressure. The modification shown in Figure 11 is one that may be desirable in some installations.

Another alternative arrangement that may be desirable in certain installations is that shown in Figure 8 wherein the cylinder 254 of unit 250 has a conduit 376 connecting its right hand end with the air inlet, there being a branch conduit 378 communicating with the left hand end of the cylinder 252 of the unit 251. The left hand end of cylinder 254 is connected with the venturi 143 by a conduit 380.

In this arrangement the unit 250 is controlled by the pressures in the air inlet and the pressures in the venturi, the unit 251 being controlled by the air inlet pressure.

If desired suction and impact tubes may be included in the connections with the inlet and venturi. As shown, there is an impact tube 382 connected with the conduit 376 and a suction tube 384 connected with the conduit 380. These tubes modify the pressures in the conduits 376 and 380 relative to the pressures prevailing in the air inlet and venturi respectively, an arrangement that may be desirable in certain types of installations. It is to be understood that while the arrangement shown in Figure 8, relative to the suction and impact tubes, may be used said tubes may be otherwise arranged. That is conduit 376 may have a suction tube and conduit 380 may have an impact tube. Also it is to be understood that tubes of this character may be used in connection with any of the conduits of the other modifications of the invention to effect modification of the action of the units 250 and 251.

In the modification shown in Figure 9, the tube 278 is connected to the passage 212 and the conduit 282 is connected to a venturi 212a in said passage 212. This arrangement functions generally in a manner similar to the arrangement shown in Figure 1 although said functioning will be modified somewhat due to the fact that the conduit 284 is omitted, but it is to be understood, of course, that said conduit may be used if desired. A particular advantage of the arrangement shown in Figure 9 is that it will accurately control the supercharger speed should the valve 172 become stuck in an open position, a contingency which might happen, and which, in the arrangement shown in Figure 1, would result in a loss of air pressure in the chamber 142 and improper functioning of the overcontrol system.

Governor

If desired, a governor mechanism may be provided in the arrangement and includes offset valves 390, Figure 11, which are closed by air flow through the induction passages. The governor control means for said valves 390 may be of any conventional well known commercial type which controls the valve in the well known manner. Such an arrangement may be desirable when the engine is installed in certain types of commercial vehicles wherein it is desired to limit the maximum speed of the vehicle.

Modification shown in Figures 12 to 15

In the modifications shown in Figures 12 to 15 the split engine control mechanism is not shown but may be included if desired. In this modification and referring to Figure 12, an air conduit 400 is connected with the chamber 142 and said conduit has an air filter 402 at its inlet end, which filter may be of any well known type. The passage 400 is controlled by a pressure control valve 404 mounted on a shaft 405 to which a valve lever 406 is secured. Closing of valve 404 resutls in a build up of supercharger air pressure supplied to the induction passages of the carburetor system, the control and operation of said valve 404 being hereinafter described. Lever 114 is connected to the primary throttle by rod 184 and to the secondary throttle by lever 196 and rod 194 and this portion of the carburetor control mechanism operates in substantially the same manner as that hereinabove described in regard to the embodiment of Figure 1. However it is to be noted that lever 196 has an extension 408 which is connected by a rod 410 to the lever 406 of the air valve 404. The rod 410 is provided with a slot 412 having a notch 414 with a shoulder 415 similar to shoulder 315 in Figure 1, and the slotted end of rod 410 is urged downwardly and to the left by a spring 416. An adjustable stop 418 is provided for engagement with one edge of the rod 410.

The supercharger drive, as shown, includes an epicyclic transmission indicated generally at 420, and a clutch indicated generally at 422 which may be of any suitable type such as one having disk plates 426 and 428 connected with shafts 424 and 430 respectively. Shaft 424 is driven by the engine through any suitable gearing or other arrangement and plate 426 is attached to a slidable collar 432 on said shaft so that it may be moved into and out of engagement with plate 428 fixed to shaft 430 to effect a transmission of power from shaft 424 to shaft 430, the collar 432 being actuated by a lever 434 pivoted intermediate its ends at 436. The plate 426 is normally urged out of engagement with plate 428 by a spring 438 and the clutch is controlled by a hydraulic motor indicated generally at 440 which includes a piston 442 reciprocable in a cylinder 444 and urged to the right by a spring 446 and to the left by the pressure of hydraulic fluid supplied from an oil pump 448, which may be engine operated, or other suitable source of fluid pressure, and transmitted through a conduit 449, a valve 450 and conduit 452. The epicyclic transmission, best shown in Figure 14, includes a sun gear 460 attached to a pulley shaft 466 and meshed with a pinion 462 mounted on a spider 464 connected with the shaft 430. The pinion 462 is also meshed with an internal gear 468 of a drum 470 which is rotatably mounted on shaft 430. A brake band 472 is adapted to engage the exterior surface of the drum and said brake band is actuated by a hydraulic motor indicated generally at 474, Figures 12 and 13. The hydraulic motor includes a cylinder 476 in which a piston 478 is operably received and which is connected with the brake drum by a link 480, a spring 482 urging the piston in a direction to release the brake band 472 from engagement with the drum 470. The brake band is moved into engagement with the drum 470 by hydraulic pressure on the piston, said pressure being transmitted through a conduit 484 from the pump 448 by way of the valve 450. The shafts 430 and 466 may be directly connected through an overrunning clutch indicated generally at 437, Figure 14, and shown in detail in Figure 15, said clutch including an outer casing 486 connected to the shaft 466 and an interior member 488 rotatable therein and connected with shaft 430 and having tapered notches 490 in which are received balls 492. When the outer member 486 rotates faster than the member 488, as when the brake band holds the drum 470 stationary and power is transmitted through the epicyclic chain of gears, the balls 492 will not wedge in the smaller portion of the notches 490. However, when the brake band 472 is released the speed of the member 486 drops to the speed of the member 488 the balls 492 become wedged in the smaller portions of the notches 490 thereby effecting a direct drive between the shaft 430 and the shaft 466.

The construction of the valve 450 is best shown in Figure 13 and includes a casing 494 in which there is disposed a rotatable member 496 having a passage 498 therethrough. Member 496 of the valve is attached to a lever 500 which in turn is pivotally connected with a link 502 having a slot 504 adjacent its opposite end and which receives therein a pin 506 fixed in lever 196.

Means for relieving the pressure in the motors 444 and 474 is provided and comprises a passage 507 in member 496 which is arranged to connect conduits 452 and 484 with a pressure relief conduit 509 which may lead back to the engine crankcase or other oil reservoir. A stop 511 is provided to limit clockwise rotation of lever 500 to a position whereat passage 498 will be moved into register with the pressure relief conduit 509.

Operation

The operation of the arrangement shown in Figures 12 to 16 inclusive is as follows:

When the lever 114 is in the position indicated at 1b the throttle valves are in the substantially closed or idling position, the supercharger is inoperative and the pressure control valve 404 is open. Movement of lever 114 to position 2b effects opening of the primary throttle valve. The supercharger is inoperative up to this point and the pressure control valve 404 is open. Further movement of lever 114 in the clockwise direction will cause lug 202 to pick up lever 196 and effect opening of the second stage carburetor throttle and when the levers 114 and 196 are moved to position 3b both the primary and secondary throttle valves are fuly open. As the levers 114 and 196 are moved from position 2b to 3b pin 506 in lever 196 engages the right hand end of slot 504 to effect actuation of the valve 450 which is opened sufficiently to permit fluid delivered from the oil pump 448 through the conduit 449 to actuate the piston 442 of the hydraulic motor 440 to the left for engagement of the clutch plates 426 and 428. The overrunning clutch 437 then provided a direct drive between the shafts 430 and 466 bringing the supercharger into action at low speed. At the same time extension 408 in which a pin 510 is fixed moves in a clockwise direction so that the pin 510 enters the notch 414 due to the angular force of the spring 416. When the levers 114 and 196 have reached position 3b the pin 510 has engaged the shoulder 415 and just begun to move rod 410 so that valve 404 is beginning to close. Movement of the levers 114 and 196 to position 4b effects closing of the pressure control valve 404 so that full supercharger pressure is supplied to the induction passages of the carburetors. The supercharger is now operating at low speed but ready to shift to high speed and the rod 410 is just engaging the stop 418. Slight additional movement of levers 114 and 196 in a clockwise direction causes the pin 510 to be released from the notch 414 so that the pressure control valve 404 is opened by the spring 416, and also causes the valve element or member 496 of the valve 450 to be moved to a position whereat fluid is supplied to the conduit 484 and pressure is transmitted to the piston 478 of the hydraulic motor 474 for effecting actuation of the brake band 472. The actuation of the brake band effects stopping of the drum 470 to shift the transmission 420 into high gear and effect high speed operation of the supercharger, the overrunning clutch 437 then being inoperative to transmit power between the shafts 430 and 466 due to the fact that shaft 466 is rotating faster than shaft 430. It is to be noted that the pin 510 now is at the upper end of slot 412 and that further movement of the levers 114 and 196 in the clockwise direction will effect closing movement of the valve 404. When the levers 114 and 196 are moved to the 5b position the valve 404 is fully closed and air at full supercharger pressure is supplied to the induction passages.

With counterclockwise movement of levers 114 and 196 the pressure relief valve is opened, the supercharger speed is first reduced and then the device rendered inoperative and the throttle valves are successively closed.

*Pressure control valve means of Figure 16*

The alternative control means for the pressure valve 404, which is shown in Figure 16, includes rods 410a and 410b forming a toggle linkage between the extension 408 of lever 196 and the pressure valve lever 406. Rods 410a and 410b are pivoted together at 552, rod 410a being provided with a slot adjacent its free end in which is slidably received the pin 510 attached to the extension 408 and the rod 410b has a pivotal connection at 411 with the lever 406. A connecting rod 550 also has one end pivoted at 552 and has its opposite end pivoted at 554 to a piston rod 556 secured to a piston 558 slidable in a cylinder 560. The piston 558 is urged by a spring 562 in a direction to move the rod 556 inwardly relative to the cylinder, said piston being urged in the opposite direction by oil pressure or the like. As shown the piston is actuated by oil pressure which is transmitted to the cylinder 560 by means of a conduit 564 connected to the conduit 484, Figure 12, although it is to be understood that said conduit 564 may be connected to any other suitable source of fluid pressure controlled in the required manner as hereinafter described.

*Operation of the control means of Figure 16*

The operation of the throttle valves of the arrangement of Figure 16 is the same as described above in connection with the throttle valves of the arrangement of Figure 12. With this in mind the operation of the pressure control valve 404, with respect to the action of the throttle valves, is as follows:

When the lever 114 is at position 1b the throttle valves are closed, the supercharger is inoperative, and the pressure control valve 404 is open, said valve 404 being urged to the open position by a spring 416a attached to lever 406. A stop 417 is provided in the path of lever 406 to limit the opening movement of the valve 404. Movement of lever 114 to position 2b effects opening of the primary throttle valve and continued movement of lever 114 in the same direction from position 2b to 3b effects openings of the secondary throttle valve. When the levers 114 and 196 have reached position 3b the pin 506 of lever 196 has reached the inner end of slot 504 and the pin 510 has reached the inner end of slot 412a. Slight movement of levers 114 and 196 beyond position 3b will cause the valve 450 to permit oil from the pump to pass into the conduit 452 thereby starting the supercharger at low speed, and as the levers 114 and 196 are moved from position 3b to 4b the pressure control valve 404 is moved to the closed position thereby accordingly increasing the pressure of air to the carburetors. As the pressure control valve 404 is closed as above described it is to be understood that the spring 562 maintains the piston 558 in the position shown in Figure 16 so that the rods 410a and 410b are maintained in substantial alignment and longitudinal movement of said rods is permitted by the pivotal connections of the connecting rod 550. Movement of levers 114 and 196 beyond position 4b effect shifting of the insupercharger into high speed as described in connection with Figure 12, there then being oil under pressure in conduit 484. Some of this oil is transmitted by conduit 564 to the cylinder 560 for moving the piston 558 to the right, as shown in Figure 16, so that the linkage 410a, 410b assumes the angular dotted line position shown in the figure. This actuation of the linkage effects full opening of the pressure control valve 404 at which time the pin 510 of extension 408 is disposed adjacent the inner end of slot 412a so that further clockwise movement of levers 114 and 196 effect a progressive closing of the valve 404 to again effect building up of the air pressure delivered to the carburetors. Counterclockwise movement of levers 114 and 196 effect a reversal of the above described sequence of operations, there being a smooth transition from one stage to another throughout the entire operating range.

In the present invention it is to be noted that it may be desirable in some installations to use servomotors to effect actuation of various controls.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the forms hereinbefore described being merely preferred embodiments.

We claim:

1. In a control means for a multiple cylinder internal combustion engine: a carburetor adapted to supply fuel mixture to the engine; means for at times rendering a portion of the cylinders of the engine inoperative; means correlated with the second mentionel means for supplying air to the carburetor at superatmospheric pressure; means for controlling the third mentioned means, the fourth mentioned means being so constructed and arranged that the third mentioned means is rendered operative only when the engine is under a substantial load when only a portion of the cylinders are operating and when said engine is under a substantial load with all of said cylinders operating.

2. In a control means for a multiple cylinder internal combustion engine: a carburetor adapted to supply fuel mixture to the engine; means for at times rendering a portion of the cylinders of the engine inoperative; means for supplying air to the carburetor at superatmospheric pressure; means for controlling the second mentioned means, so constructed and arranged, that when the engine is operated under a light load a portion of the cylinders are rendered functionally inoperative and when the engine is operated under heavier loads all the cylinders thereof are operative; and means for controlling the third mentioned means, so constructed and arranged, that said third mentioned means is rendered operative when the engine is operated under relatively heavy load conditions with a portion of the cylinders inoperative, and is also rendered operative under relatively heavy load conditions when the engine is operating on all of its cylinders.

3. In a control means for a multiple cylinder engine: means for rendering a portion of said cylinders functionally inoperative at times; a charge forming device for supplying the engine with fuel mixture; means for supplying the charge forming device with air at superatmospheric pressure; and control means for regulating the air supply means, said control means being adapted to render the air supply means operative only through the upper range of operation both when a portion of the cylinders are rendered inoperative and when all the cylinders are operating.

4. The invention defined by claim 3 wherein the control means is also responsive to the pressure of air supplied to the charge forming device.

5. The invention defined by claim 3 wherein the control means includes means responsive to the mass rate of air flow through the charge forming device.

6. The invention defined by claim 3 wherein the control means is responsive to air pressure and the mass rate of air flow through the charge forming device.

7. In a control means for a multiple cylinder internal combustion engine: means for rendering a portion of said cylinders functionally inoperative at times; a multiple stage carburetor system wherein the fuel mixture is supplied to the engine by a plurality of induction passages; a throttle valve for each of said induction passages; means for successively opening and closing said throttle valves; means for supplying air to the induction passages at superatmospheric pressure; means for controlling said means for supplying air at superatmospheric pressure; and means for interconnecting the second mentioned means, the means for controlling the throttle valves and the means for controlling the fourth mentioned means.

8. In a control means for a multiple cylinder internal combustion engine: a multiple stage carburetor for supplying fuel mixture to the engine and having a plurality of induction passages; throttle valves for said induction passages adapted to be successively opened and closed; means correlated with the throttle valves for rendering a portion of the cylinders of the engine functionally inoperative at times; a supercharger adapted to supply air to the carburetor at superatmospheric pressure; control means for the supercharger; and means interconnecting the second mentioned means and the control means whereby the controls of the second mentioned means and the supercharger are correlated.

9. In a control means for a multiple cylinder internal combustion engine: means for rendering a portion of said cylinders functionally inoperative; a multiple stage carburetor system including a plurality of induction passages; throttle valves for said induction passages; means for successively opening the throttle valves; a supercharger adapted to deliver air to the induction passages at superatmospheric pressure; control means for said supercharger including a variable output coupling having a connection with the engine for driving same; a connection with the throttle valve control mechanism for varying the output of the coupling; and means, interconnecting the second mentioned means and the throttle control means for controlling said second mentioned means.

10. In a control means for a multiple cylinder internal combustion engine: means for at times rendering a portion of the cylinders functionally inoperative; a multiple stage carburetor system having primary and secondary induction passages; a throttle valve in each of said induction passages; means including a lever for controlling the throttle valves, said lever being adapted to open and close the first stage throttle valve and a second lever for opening and closing the second stage throttle valve, the first lever being adapted to at times effect actuation of the second lever for actuating the second stage throttle valve; a supercharger adapted to supply the induction passages with air at superatmospheric pressure, and means for operatively connecting the second and third mentioned means.

11. In a control means for a multiple cylinder internal combustion engine: means for at times rendering a portion of the cylinders functionally inoperative; a multiple stage carburetor system having primary and secondary induction passages; a throttle valve in each of said induction passages; means including a lever for controlling the throttle valves, said lever being adapted to open and close the first stage throttle valve and a second lever adapted to open and close the second stage throttle valve, the first lever being adapted to at times effect actuation of the second lever for actuating the second stage throttle valve; a supercharger adapted to supply the induction passages with air at superatmospheric pressure; control means for the supercharger adapted to vary its speed relative to engine speed; said control means being controlled by the means for actuating the throttle valves.

12. In a control means for an internal combustion engine having an induction system: a multiple stage carburetor having primary and secondary induction passages for delivering fuel mixture to the induction system; throttle valves for said induction passages; means for controlling the throttle valves in series; a supercharger for boosting the fluid pressure in said induction system; and means for controlling the supercharger in accordance with predetermined throttle valve positions.

13. In a control means for an internal combustion engine having an induction system: a multiple stage carburetor having primary and secondary induction passages forming a part of the induction system; throttle valves for said induction passages; means for controlling the throttle valves in series; a supercharger for boosting the fluid pressure in the induction system; means for controlling the supercharger in accordance with predetermined throttle valve positions; and control means for the supercharger so constructed and arranged, as to control said supercharger in accordance with fluid conditions within the induction system of the engine.

14. In a control means for an internal combustion engine having an induction system: a multiple stage carburetor having primary and secondary induction passages forming part of the induction system; throttle valves for said induction passages; means for controlling the throttle valves in series; a supercharger for boosting the fluid pressure in the induction system; means for controlling the speed of the supercharger relative to engine speed, in accordance with predetermined throttle valve positions; and means responsive to pressures in the induction system of the engine for modifying the action of the supercharger control means.

15. In a control means for an internal combustion engine having an intake manifold: a multiple stage carburetor having primary and secondary induction passages for delivering fuel mixture to said manifold, said manifold and induction passages comprising the induction system of the engine; throttle valves for said induction passages; means for controlling the throttle valves in series; a supercharger for boosting the fluid pressure in the induction system; means, controlled by the second mentioned means, for controlling the supercharger in accordance with predetermined throttle valve positions; and means responsive to the mass rate of air flow in the induction system of the engine for modifying the output of the supercharger as effected by the third mentioned means.

16. In a control means for an internal combustion engine having an intake manifold: a multiple stage carburetor having primary and secondary induction passages connected to the manifold, said passages and manifold comprising the induction system of the engine; throttle valves for said induction passages; manual means for controlling the throttle valves in series; a supercharger for boosting the fluid pressure in the induction system; means connected with and controlled by said manual means for controlling the supercharger; and overcontrol means for varying the action of the third mentioned means, said overcontrol means including means responsive to pressure and the mass rate of air flow in the induction system of the engine.

17. In a control mechanism for an internal combustion engine having a plurality of cylinders: a multiple stage carburetor having a plurality of induction passages; throttle valves for said passages; means for successively opening and closing said throttle valves; and means for rendering a portion of the engine cylinders inoperative at times, said means being operatively connected with the means for controlling the throttle valves.

18. In a control means for an internal combustion engine having a plurality of cylinders: means for supplying air for the engine fuel mixture at superatmospheric pressure; and means for at times rendering a portion of the engine cylinders functionally inoperative; the means for supplying air under superatmospheric pressure being adapted to be rendered inoperative when the engine is operating under loads below a predetermined value and said means is rendered operative when the engine is operating under loads above said predetermined value; the engine cylinders being rendered inoperative when said engine is operating under light loads below a predetermined value and said cylinders being rendered operative when the engine is operating under loads above said value.

19. In a control means for an internal combustion engine having an induction system: a supercharger for the induction system; and means, including a device responsive to the mass rate of air flow in the induction system, for controlling the supercharger.

20. In a control means for an internal combustion engine having an induction system: a supercharger for the induction system; and means for controlling the supercharger, said means being responsive to pressure and mass rate of air flow in the induction system posterior to the supercharger.

21. In a control means for a multiple cylinder internal combustion engine: means for rendering a portion of said cylinders functionally inoperative at times; a multiple stage carburetor system wherein the fuel mixture is supplied to the engine by a plurality of induction passages; throttle valves for said induction passages; means for successively opening and closing said throttle valves; means for supplying air to the induction passages at superatmospheric pressure; means for controlling said means for supplying air at superatmospheric pressure; and means for interconnecting the second mentioned means, the means for controlling the throttle valves and the means for controlling the fourth mentioned means; said controls being so constructed and arranged that the sequence of operations comprises opening of the first stage throttle valve during which time a portion of the engine cylinders are functionally inoperative, bringing the supercharger into operation, cutting out the supercharger, rendering all of the cylinders of the engine operative, opening of the second stage throttle, and again bringing the supercharger into operation.

22. In a control means for a multiple cylinder internal combustion engine: means for rendering a portion of said cylinders functionally inoperative at times; an induction system for the engine including a multiple stage carburetor having primary and secondary induction passages; throttle valves in said induction passages; a supercharger for supplying the carburetor with air at superatmospheric pressure; control means for variably regulating the speed of the supercharger relative to engine speed; and manual means for controlling the throttle valves in the induction passages and the supercharger control means, said manual means being so constructed and arranged as to first open the primary throttle, then operate the supercharger control means throughout its operative range, cut out the supercharger, move the secondary throttle to fully open position, and again actuate the supercharger control means throughout its range of operation.

23. The invention defined by claim 22 including overcontrol means responsive to pressure in the induction system of the engine for modifying the action of the supercharger control means.

24. The invention defined by claim 22 including means responsive to the mass rate of air flow through the induction system of the engine for modifying the action of the supercharger control means.

25. The invention defined by claim 22 including overcontrol means responsive to pressure in and the mass rate of air flow through the induction system of the engine posterior to the supercharger for modifying the action of the control of the supercharger control means.

26. In a control means for a multiple cylinder internal combustion engine: means for rendering a portion of said cylinders functionally inoperative; a multiple stage carburetor system including a plurality of induction passages; throttle valves for said induction passages; means for successively opening the throttle valves; a supercharger adapted to deliver air to the induction passages at superatmospheric pressure; control means for said supercharger including a variable output coupling having a connection with the engine for driving same; and a connection with the throttle valve control mechanism for varying the output of the coupling; the control means for the supercharger being adapted to render said supercharger operative when the first stage throttle valve reaches its substantially fully open position, render the supercharger inoperative at approximately the same time that the second stage throttle valve begins to open, and to again render the supercharger operative when the second stage throttle valve reaches substantially fully open position.

27. In a control means for a multiple cylinder internal combustion engine: means for at times rendering functionally inoperative a portion of the engine cylinders, said means including hydraulic actuated mechanism and electrical means for controlling said hydraulic actuating mechanism; a multiple stage carburetor system including a plurality of induction passages; throttle valves for said passagees; means for successively opening said throttle valves, said means being connected with electrical means for controlling the hydraulic actuating mechanism and being so constructed and arranged that a portion of the cylinders are rendered inoperative throughout the range of the first stage throttle valve and said cylinders rendered operative throughout the range of the second stage throttle valve; a supercharger for supplying air to the induction passages at superatmospheric pressure; means for actuating said supercharger and including a variable speed coupling connected with a source of power; and means, connected with the throttle control mechanism, for controlling the speed of the coupling, said coupling being inoperative to transmit power throughout the opening movement of the first stage throttle valve and rendered operative to transmit power between the movement of the throttle valve actuating mechanism which effects full opening of the first stage throttle valve but before effecting opening movement of the second stage throttle valve, said coupling being rendered inoperative throughout opening movement of the second stage throttle and rendered operative again when said second stage throttle has been fully opened.

28. In a control means for a multiple stage cylinder internal combustion engine: a multiple stage carburetor system having first and second stage induction passages; a throttle valve in each of said induction passages; means for controlling the throttle valve, said means being so constructed and arranged that upon movement in one direction the first stage throttle is opened and then the second stage throttle is opened; means for at times supplying the induction passages with air at superatmospheric pressure; and means for at times rendering a portion of the engine cylinders functionally inoperative, said means comprising a hydraulically actuated mechanism; an electrically actuated valve for controlling the hydraulic fluid to said actuating mechanism; and a snap switch control for the electrical system, said switch being connected with the valve actuating mechanism and adapted to so control the valve that a portion of the cylinders of the engine are rendered inoperative while the first stage throttle valve is being opened and said cylinders are rendered operative at approximately the same time that the second stage throttle valve begins to open.

29. Control means for a multiple cylinder in internal combustion engines having an induction system and hydraulically operated exhaust and intake valve mechanism; hydraulically actuated means for controlling the hydraulic valve mechanisms, said hydraulically actuated means being so constructed and arranged as to render a portion of said mechanisms functionally inoperative; electrically controlled means for controlling the hydraulically actuated means; a multiple stage carburetor system for the engine induction system, including primary and secondary induction passages; venturis in said induction passages; throttle valves in said induction passages posterior to said venturis; a supercharger adapted to supply air under superatmospheric pressure to the induction passages; a driving coupling for the supercharger driven by the engine and adapted to variably control the speed of the supercharger relative to engine speed; coupling control means adapted to vary the output of the coupling relative to engine speed; a throttle control lever for the primary throttle valve and a second lever for the secondary throttle valve; a link connected at one end to the coupling control means and having a slot in the other end, said slot including a notched portion intermediate the ends thereof; a pin connected with the first mentioned throttle control lever and slidably received in the notched slot; a stop adapted to be engaged by the link; a snap switch controlling the electrical means and controlled by the first mentioned throttle control lever; the various control means being so constructed and arranged that when the engine is operating and the throttle valves are substantially closed a portion of the cylinders are functionally inoperative, that actuation of the first mentioned throttle control lever in one direction effects opening of the primary throttle, during which portion of its movement the pin slides in the slot and moves into the notch, continued movement of said lever effects actuation of the coupling control means until same effects maximum coupling output relative to engine speed, the link then engaging the stop for forcing the pin out of the notch and effecting actuation of the coupling control mechanism to stop the supercharger, further actuation of the first mentioned lever in the same direction being adapted to actuate the switch for rendering all the valve actuating mechanism of the engine operative and engaging the second mentioned lever for opening the secondary throttle, and upon full opening of the secondary throttle the pin engages the inner end of the slot of the link for again actuating the coupling control, and overcontrol means for modifying the action of the coupling control as effected through the link said means comprising first and second cylinders; pistons in said cylinders; one way connections between the respective pistons and the coupling control means; connections on opposite sides of the piston in the first mentioned cylinder and the primary induction passage, one of said connections being with the inlet portion of the primary induction passage, and the other connection being with the venturi in said passage; a connection between the last mentioned connection and the primary induction passage posterior to the throttle valve thereof; and a connection with the second mentioned cylinder and the inlet of the primary induction passage; and check valve in said other connection and third mentioned connection.

30. The invention defined by claim 29 wherein the second mentioned connection has a branch connected with the venturi of the secondary induction passage; and a restriction in said branch.

31. The invention defined by claim 29 wherein the hydraulically actuated means is so constructed and arranged that the initial movement thereof is relatively rapid, an intermediate portion of its movement is relatively slow, and the remaining portion of its movement is relatively fast, and wherein the exhaust valves are cut out before the intake valves for rendering a portion of the engine cylinders inoperative and the exhaust valves are cut in ahead of the intake valves in rendering the cylinders operative.

32. In a control means for an internal combustion engine: a multiple stage carburetor system including primary and secondary induction passages; throttle valves for said passages; a venturi in at least the primary induction passage anterior to the throttle valve thereof; a supercharger; manual means for opening and closing the throttle valves in series and for controlling the supercharger; and overcontrol means for the supercharger control including a cylinder; a spring actuated piston in said cylinder; conduits connected with said cylinder on opposite sides of the piston, one of said conduits being connected with the inlet of the primary induction passage and the other of said conduits being connected with the venturi in the primary induction passage; a branch conduit for said other conduit connected with the primary induction passage posterior to the throttle valve; a restriction in said other conduit; a check valve in said other conduit and in said branch conduit; a second cylinder; a spring actuated piston in said second cylinder and a connection between the second cylinder and the inlet of the primary induction passage adapted to actuate said piston; and one way connections between the pistons and the supercharger control means.

33. In a control means for an internal combustion engine: a multiple stage carburetor system including primary and secondary induction passages, throttle valves in said passages; venturis in said passages anterior to the throttle valves; manual means for actuating the throttle valves in series; a supercharger; means for controlling the supercharger; a connection with the last mentioned means and the manual means for actuating the throttle valves, said connection including a toggle mechanism; and a pressure actuated device so constructed and arranged as to make and break the toggle.

34. In an internal combustion engine having an induction system including a carburetor having a throttle controlled induction passage and a venturi in said passage anterior to the throttle valve; a supercharger for supplying air to the induction passage under superatmospheric pressure; manual means for controlling the supercharger; and overcontrol means for the supercharger control adapted to modify the action of the manually controlled means and comprising means responsive to the air pressure between the supercharger and the venturi, air flow through the venturi, and the pressure in the induction passage posterior to the throttle valve.

35. In a control mechanism for a multiple cylinder internal combustion engine: a multiple stage carburetor system including primary and secondary induction passages; throttle valves in said passages; manual means for opening and closing the throttle valves in series; control means for at times rendering a portion of the engine cylinders functionally inoperative; electrical means for controlling said control means and including an electric switch; means connecting the manual means with the electric switch, said means being so constructed and arranged that said switch is actuated as the primary throttle reaches substantially fully open position and the secondary throttle begins to open, and also as the secondary throttle is fully closed and the primary throttle begins to close.

36. In a control mechanism for an internal combustion engine having a plurality of cylinders: a multiple stage carburetor having a plurality of induction passages; throttle valves for said passages; means for successively opening and closing said throttle valves; and means for rendering a portion of the engine cylinders inoperative at times, said means being operatively connected with the means for controlling the throttle valves and said second mentioned means being adapted to render a portion of the cylinders inoperative throughout substantially the entire range of the first stage carburetor and render said cylinders operative at other times.

37. In a control mechanism for a multiple cylinder internal combustion engine: a multiple stage carburetor system including a plurality of induction passages; a throttle valve in each of said passages; means for controlling said throttle valves so that the first stage throttle valve is opened prior to the opening of the second stage throttle valve; and means for rendering a portion of the cylinders of said engine inoperative at times, said means including hydraulically actuated means and electrically controlled means for controlling the hydraulically actuated means; the electrically controlled means including a switch connected with the mechanism for actuating the throttle valve and so operated that the engine cylinders are rendered functionally inoperative prior to the opening of the secondary throttle valve and are rendered operative throughout the range of said secondary throttle valve.

38. In a control mechanism for an internal combustion engine: an induction system; a venturi in said system; a throttle valve in the induction system posterior to the venturi; a supercharger for said induction system adapted to deliver air under superatmospheric pressure to the inlet of the induction system; manual means for controlling the relative speed of the supercharger; and overcontrol means adapted to modify the manual control, said overcontrol means being responsive to supercharger outlet pressure, Venturi pressure and pressure posterior to the throttle valve.

39. In a control mechanism for an internal combustion engine: an induction system for said engine; a supercharger connected with said induction system; a venturi in said induction system posterior to the supercharger; a throttle valve in said system posterior to the venturi; and means for variably controlling the speed of the supercharger relative to engine speed and including a pair of cylinders; spring urged pistons in each of said cylinders; means, including lost motion devices, connecting said pistons with the supercharger control means; a conduit connecting one end of one of the cylinders with the induction system between the supercharger and the venturi; a suction conduit connecting the other end of the cylinder with the venturi; a branch conduit connecting the second conduit with the induction system posterior to the throttle valve; and means for connecting one end of the other cylinder with the induction passage between the venturi and supercharger.

40. In a control mechanism for an internal combustion engine having an induction system and a supercharger for said system: a control for said supercharger; a venturi in said system; a throttle in said system posterior to the venturi; a suction responsive device, including a spring urged movable wall member; means for subjecting one side of said movable wall member to Venturi pressure and the other side of said movable wall member to induction system pressure posterior to the throttle; a second suction responsive device having a spring urged movable wall member; means for subjecting one face of the last mentioned movable wall member to induction system pressure anterior to the venturi; and means, including lost motion devices, interconnecting the movable wall members and connecting same with the supercharger control.

41. In a control mechanism for an internal combustion engine having an induction system with a venturi therein and a supercharger anterior to said venturi: control means for the supercharger including a spring urged moveable wall member; means for subjecting one side of said wall member to induction system pressure between the supercharger and venturi; means for subjecting the other side of said wall member to Venturi pressure; a second spring urged moveable wall member; means for subjecting one side of said second wall member to induction system pressure between the venturi and supercharger; and means including a pin and slot device, interconnecting the moveable wall members and connecting said members with the supercharger control means.

42. The invention defined by claim 41 and including means for modifying the pressure to the suction responsive means relative to that in the respective parts of the induction system with which said means are connected.

43. In a control mechanism for an internal combustion engine: a multiple stage carburetor system having a plurality of induction passages; throttle valves controlling said passages; means for actuating the valves in series, said means including a link for each valve; a pin and slot, lost motion connection between the links and the respective throttle valves; and yielding means for each connection adapted to urge the pin toward one end of the slot.

44. In an internal combustion engine: a multiple stage carburetor system including primary and secondary induction passages; an air chamber anterior to the induction passages, an atmospheric air inlet for said chamber; an unbalanced air flow valve controlling the inlet; means yieldingly urging the valve to the closed position; a supercharger adapted to deliver air under superatmospheric pressure to the chamber; and throttle valves controlling the respective induction passages.

45. In a control mechanism for an internal combustion engine: a carburetor having an induction passage; a throttle valve in said passage; a supercharger adapted to deliver air under superatmospheric pressure to the induction passage; an atmospheric passage adapted to permit air delivered by the supercharger to escape to atmosphere; a valve controlling said atmospheric passage; multiple stage means for variably controlling the supercharger speed relative to engine speed; and means for controlling the throttle valve, the valve in the atmospheric passage and the supercharger, said means being so constructed and arranged that upon a shift of the supercharger from one stage to the other the valve in the atmospheric passage may be variably positioned to vary the effective output of the supercharger.

46. In a control mechanism for an internal combustion engine: a multiple stage carburetor including primary and secondary induction passages; a throttle valve in each passage; an air chamber connected with the inlets of the induction passage; an atmospheric passage connected to the chamber; a pressure control valve in said atmospheric passage; a supercharger adapted to deliver air under superatmospheric pressure to the chamber; multiple stage driving means for the supercharger; and control means for the throttle valves, pressure valve, and supercharger driving means, said control means being so constructed and arranged that upon movement thereof in one direction the throttle valves are adapted to be successively opened and the supercharger driving means thereafter shifted to a low speed stage, whereupon the pressure control valve is moved to closed position and upon the pressure control valve reaching fully closed position the same is snapped open and the supercharging driving means is shifted to a high speed and the pressure control valve again moved to closed position.

47. In a control mechanism: a device to be actuated; an actuating member; a link between said member and device said link being adapted to be moved longitudinally and laterally; a slot in said link, said slot including a notch; a pin connected to said member and slidably received in the slot; yielding means urging the link in one longitudinal direction and angularly; the actuating member being adapted to move the pin in the slot, the angular urging of the link by the yielding means being adapted to cause the pin to enter the notch and actuate the link; and stop means for limiting lateral movement of the link so positioned that the pin will move out of the notch upon lateral movement of said link beyond its stop engaging position, said pin being adapted to be moved by the actuating member into engagement with one end of the slot for further actuation of same.

48. In an internal combustion engine: a multiple stage carburetor system including primary and secondary induction passages; throttle valves in said induction passages; a supercharger adapted to supply air under superatmospheric pressure to the induction passages; an atmospheric passage posterior to the supercharger; a pressure control valve in said atmospheric passage; manual control means adapted to open the throttle valves and to control the supercharger speed; a toggle connecting the manual control means and the pressure control valve; yielding means adapted to urge the control valve to the open position; and a pressure responsive device adapted to control the effective length of the toggle.

49. The method of controlling a multiple cylinder internal combustion engine comprising operating the engine on a portion of the cylinders only under light load conditions; supplying part of the fuel mixture from one induction passage; increasing the pressure of the fluid supplied to the engine; reducing the said pressure of said fluid; supplying additional fuel mixture from a second induction passage; and again increasing the pressure of the fuel mixture supplied to the engine.

50. The invention defined by claim 49 and including varying said pressure in accordance with pressures and mass flow of at least one of the components of the fuel mixture.

51. The method of controlling an internal combustion engine comprising supplying the engine intake with fuel mixture from an induction passage; supplying additional fuel mixture from a second induction passage after the first induction passage is substantially fully open, supplying air to the induction passages at superatmospheric pressure; and varying the pressure of said air in accordance with engine requirements.

52. The invention defined by claim 51 wherein the effective pressure of the air is automatically varied in accordance with pressures in the induction system of the engine and engine speed.

53. The invention defined by claim 51 wherein said air pressure is regulated in accordance with the pressures and mass flow of at least one of the components of the fuel mixture.

54. The invention defined by claim 51 wherein the pressure of said air is limited to the desired maximum relative to engine speed.

55. In a control means for a multiple cylinder internal combustion engine: a carburetor adapted to supply fuel mixture to the engine; means for at times rendering a portion of the cylinders of the engine inoperative; means for supplying air to the carburetor at superatmospheric pressure; means for controlling the supercharger, the last and second mentioned means being interconnected; said supercharger control means being so constructed and arranged that the supercharger is rendered operative when the engine is operating under a relatively heavy load and only a portion of the cylinders are operating.

56. In a control mechanism for a multiple cylinder internal combustion engine: a carburetor adapted to supply fuel mixture to the engine; means for at times rendering a portion of the cylinders of the engine inoperative; means for supplying air to the carburetor at superatmospheric pressure; means interconnected with the first mentioned means for controlling the supercharger, said supercharger control means being so constructed and arranged as to render the supercharger operative when the engine is operating on all of its cylinders and under a substantial load.

57. In a control mechanism for a multiple cylinder internal combustion engine: a carburetor adapted to supply fuel mixture to the engine; means for at times rendering a portion of the cylinders of the engine inoperative; means for supplying air to the carburetor at superatmospheric pressure; means, interconnected with the first mentioned means for controlling the supercharger; the supercharger control means being so constructed and arranged as to render the supercharger inoperative when the engine is operating under light load conditions.

58. In a control means for a multiple cylinder internal combustion engine: means for rendering a portion of the cylinders functionally inoperative at times; a charge forming device for supplying the engine with fuel mixture; a throttle valve for the charge forming device; means for controlling the throttle, said means being interconnected with the second mentioned means; means for supplying the charge forming device with air at superatmospheric pressure; and control means for regulating the air supply means, said control means being interconnected with the throttle control means, and being so constructed and arranged as to render the supercharger operative when the throttle is opened beyond a predetermined position.

59. In a control means for a multiple cylinder internal combustion engine: means for rendering a portion of said cylinders functionally inoperative at times; a charge forming device having an induction passage for supplying the engine with fuel mixture; means for supplying the charge forming device with air at superatmospheric pressures; control means for regulating the air supply means, said control means being adapted to render said air supply means operative only through the upper range of operation, both when a portion of the cylinders are rendered inoperative and when all of the cylinders are operating; and automatic means for regulating the supply of fuel mixture to the engine, said means including an unbalanced valve in said induction passage, yieldingly urged in the opening direction and adapted to be controlled by a governor mechanism, said valve being adapted to be moved in the closing direction by air flow in the induction passage.

60. In a control mechanism for an internal combustion engine having an induction system, a supercharger for said induction system, a conduit connecting said supercharger and induction system, and a venturi in the conduit: control means for the supercharger including a spring urged movable wall member; means for subjecting one side of said wall member to the pressure between the venturi and supercharger; means for subjecting the other side of said wall member to Venturi pressure; a second spring urged movable wall member; means for subjecting one side of said wall member to the first mentioned pressure; and means including a lost motion connection interconnecting the movable wall members and connecting said members with the supercharger control means.

61. The invention defined by claim 60 and including means responsive to pressure posterior to the venturi for modifying the fluid pressure on the movable wall members.

62. The invention defined by claim 60 including means for modifying the pressure to the control means in accordance with pressure posterior to said venturi; and check valve means for the third mentioned means and the pressure modifying means.

63. In a control mechanism for multiple cylinder internal combustion engines: the combination of means, including a throttle and throttle actuating mechanism, for controlling the fuel mixture supplied to said cylinders; means coordinated with the throttle actuating mechanism for rendering at least one cylinder inoperative; and means coordinated with the throttle mechanism for supplying air under superatmospheric pressure when the throttle is opened beyond a predetermined position.

64. In a control mechanism for a multiple cylinder internal combustion engine having an induction system for supplying the cylinders of the engine with a fuel mixture: means for delivering fuel mixture to said induction system; a throttle valve for said system; means for controlling the throttle valve; means for at times rendering one or more of the cylinders of the engine inoperative, said means being correlated with the throttle control means; and means, correlated with the throttle control mechanism for supplying air under superatmospheric pressure to the fuel mixture supply means in accordance with throttle position and engine operating conditions.

65. In a control means for a multiple cylinder internal combustion engine: a carburetor adapted to supply fuel mixture to the engine; means for at times rendering a portion of the cylinders of the engine inoperative; means for supplying air to the carburetor at a superatmospheric pressure; engine operated hydraulic means for driving the air supply means; a manual means for regulating hydraulic means and automatic means controlled in accordance with engine operating conditions for controlling the hydraulic means whereby the air supply means is operated at various speeds, relative to any speed.

66. In a control mechanism for an internal combustion engine: an induction system; a venturi in said system; a throttle valve in the induction system posterior to the venturi; a supercharger for the induction system adapted to deliver air under superatmospheric pressure to the induction system; manual means for controlling the speed of the supercharger; and automatic means adapted to modify the manual control in accordance with the supercharger outlet pressure, venturi pressure and pressure posterior to the throttle valve.

67. In an internal combustion engine having a plurality of cylinders; a multiple stage carburetor system including primary and secondary induction passages; a throttle valve in each induction passage; means for actuating the throttle valve in series; an unbalanced valve in one of the passages adapted to be opened by air flow therethrough; yielding means urging said valve in the closing direction; and means correlated with the throttle valve actuating means adapted to render at least one of the engine cylinders inoperative at times.

68. In an internal combustion engine having a plurality of cylinders: a multiple stage carburetor system including primary and secondary induction passages; a throttle valve in each induction passage; means for actuating the throttle valves; an unbalanced valve in at least one of the passages adapted to be opened by air flow therethrough; yielding means urging said valve in the closing direction; and means correlated with the throttle valve actuating means adapted to render at least one of the engine cylinders inoperative at times.

ALBERT H. WINKLER.
EMIL O. WIRTH.

REFERENCES CITED

The following references are of record in the file of this patent:

UNITED STATES PATENTS

| Number | Name | Date |
|---|---|---|
| 1,645,178 | Hall-Brown | Oct. 11, 1927 |
| 2,151,075 | Berger | Mar. 21, 1939 |
| 2,166,968 | Rohlin | July 25, 1939 |
| 2,186,043 | Rohlin | Jan. 9, 1940 |
| 2,223,715 | Berger | Dec. 3, 1940 |
| 2,229,144 | State et al. | Jan. 21, 1941 |
| 2,250,814 | Rohlin | July 29, 1941 |

Certificate of Correction

April 11, 1950

Patent No. 2,503,930

ALBERT H. WINKLER ET AL.

It is hereby certified that error appears in the printed specification of the above numbered patent requiring correction as follows:

Column 3, line 49, for the word "thereof" read *therefor*; column 11, line 8, for "passages" read *passage*; column 17, line 46, for "resutls" read *results*; column 19, line 12, for "fuly" read *fully*; column 20, line 58, for "effect" read *effects*; same line, for "insupercharger" read *supercharger*; column 21, line 23, for "mentionel" read *mentioned*; column 25, line 63, for "passagees" read *passages*; column 34, line 17, for "valve" read *valves*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*